(12) United States Patent
Niimura

(10) Patent No.: US 11,953,648 B1
(45) Date of Patent: Apr. 9, 2024

(54) LIGHT CURTAIN

(71) Applicant: Keyence Corporation, Osaka (JP)

(72) Inventor: Hirokazu Niimura, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 18/230,248

(22) Filed: Aug. 4, 2023

(30) Foreign Application Priority Data

Sep. 16, 2022 (JP) .................................. 2022-147677
Mar. 3, 2023 (JP) .................................. 2023-032502

(51) Int. Cl.
*G01V 8/20* (2006.01)

(52) U.S. Cl.
CPC ....................................... *G01V 8/20* (2013.01)

(58) Field of Classification Search
CPC .......................................................... G01V 8/20
See application file for complete search history.

(56) References Cited

U.S. PATENT DOCUMENTS

| | | | | |
|---|---|---|---|---|
| 5,302,942 | A | * | 4/1994 | Blau ......................... G01V 8/20 250/221 |
| 6,111,995 | A | | 8/2000 | Iwasaki et al. |
| 6,137,408 | A | | 10/2000 | Okada |
| 6,140,633 | A | | 10/2000 | Iwasaki et al. |
| 6,204,575 | B1 | | 3/2001 | Yamaguchi |
| 6,236,036 | B1 | | 5/2001 | Kudo et al. |
| 6,239,423 | B1 | | 5/2001 | Hama et al. |
| 6,414,603 | B1 | | 7/2002 | Yamaguchi et al. |
| 6,784,415 | B2 | | 8/2004 | Kudo et al. |
| 6,856,862 | B1 | * | 2/2005 | Feltner .............. H01L 21/67288 250/221 |
| 6,894,623 | B2 | | 5/2005 | Hama et al. |
| 6,979,814 | B2 | | 12/2005 | Kudo et al. |
| 7,122,782 | B2 | | 10/2006 | Sakaguchi |
| 7,368,702 | B2 | | 5/2008 | Kudo et al. |
| 7,485,841 | B2 | | 2/2009 | Inoue et al. |
| 7,550,708 | B2 | | 6/2009 | Deguchi |
| 7,696,469 | B2 | | 4/2010 | Inoue et al. |
| 7,821,394 | B2 | | 10/2010 | Fukumura |
| 8,487,236 | B2 | | 7/2013 | Tagashira |

(Continued)

FOREIGN PATENT DOCUMENTS

| | | |
|---|---|---|
| JP | 200910817 A | 1/2009 |
| JP | 2013218970 A | 10/2013 |

*Primary Examiner* — Seung C Sohn
(74) *Attorney, Agent, or Firm* — Kilyk & Bowersox, P.L.L.C.

(57) ABSTRACT

Display with high visibility without impairing rigidity of a housing is performed. A light curtain includes: a housing in which one element of a pair of elements disposed inside along a longitudinal direction in order to form the plurality of optical axes at intervals, the housing including a metal case and end members connected to both ends of the metal case; a cover that transmits light from a light projecting element, which is the one element, and is attached to the housing so as to cross the optical axe; an indicator lamp that is a light diffusing member disposed outside an outer surface of at least one of the cover and the housing along the longitudinal direction or formed in series with the cover; and an indicator lamp light source that is accommodated in the housing and supplies light for displaying toward the indicator lamp.

18 Claims, 20 Drawing Sheets

(56) References Cited

U.S. PATENT DOCUMENTS

| | | |
|---|---|---|
| 9,200,955 B2 | 12/2015 | Kawabata et al. |
| 9,304,034 B2 | 4/2016 | Ishikawa et al. |
| 2003/0029992 A1 | 2/2003 | Kudo et al. |
| 2004/0104335 A1 | 6/2004 | Sakaguchi |

* cited by examiner

FIG. 15
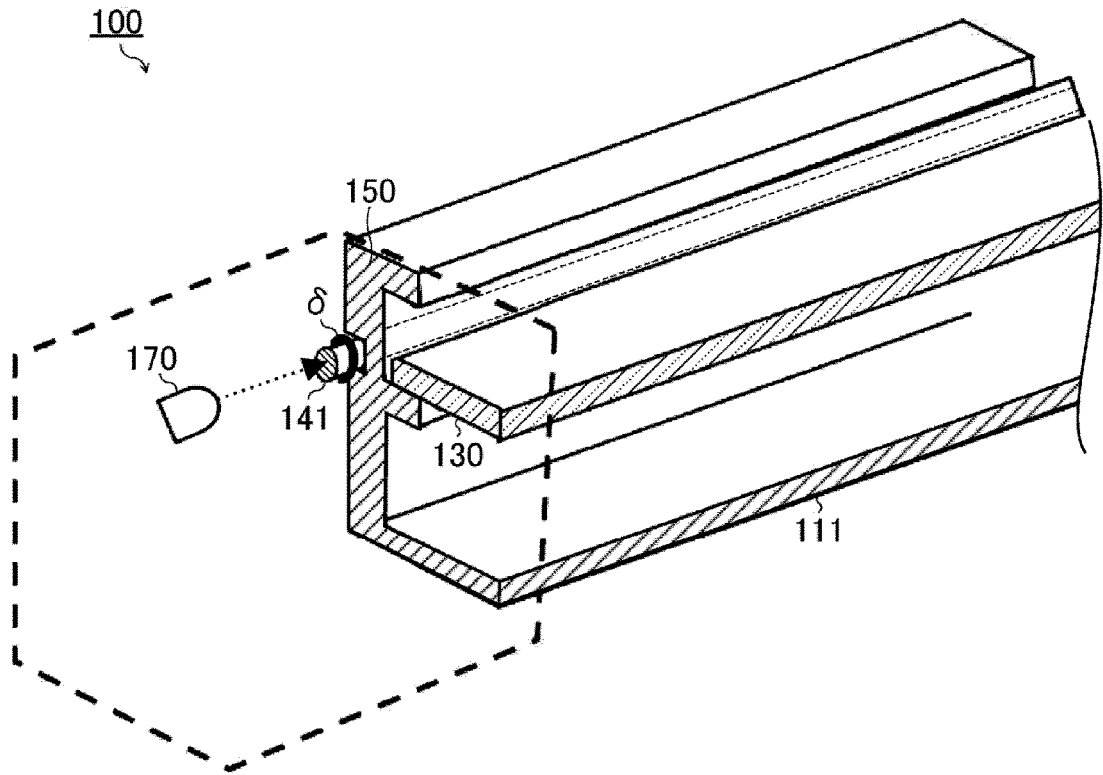
FIG. 16
| LIGHT EMISSION COLOR | OPERATION INDICATOR LAMP MODE | WORK INSTRUCTION LAMP MODE |
|---|---|---|
| GREEN | NORMAL | WORK PERMITTED |
| RED | ABNORMAL (EMERGENCY STOP) | WORK PROHIBITED |
| ORANGE | ALARM | ALARM |
FIG. 17
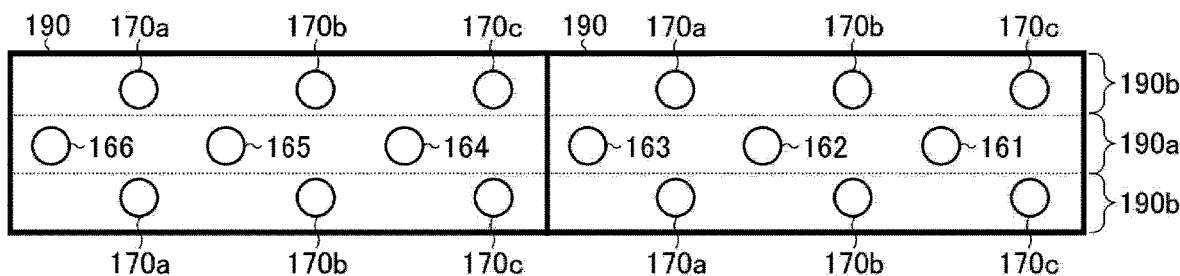

LIGHT CURTAIN

CROSS-REFERENCE TO RELATED APPLICATIONS

The present application claims foreign priority based on Japanese Patent Application No. 2022-147677, filed Sep. 16, 2022, and No. 2023-032502, filed Mar. 3, 2023, the contents of which are incorporated herein by references.

BACKGROUND OF THE INVENTION

1. Field of the Invention

The invention relates to a light curtain.

2. Description of Related Art

The light curtain is one aspect of the multiple-optical-axis photoelectric sensor, and detects a person or an object according to whether a plurality of optical axes formed between the light projector and the light receiver are shielded from light.

The light curtain has a maximum length of 2 m or more. The longer the light curtain is, the more easily the housings of the light projector and the light receiver are deformed, which makes it difficult to adjust the arrangement of the light projector and the light receiver. For this reason, many high rigidity metal cases are adopted for the housings of the light projector and the light receiver. As the metal case, an inexpensive and lightweight aluminum extruded product is generally used.

It should be noted that the light curtain can be used in a harsh environment where the risk of contamination or collision is high. Therefore, some light curtains that are required to have high robustness include a bumper portion for protecting a detection window of an optical axis (for example, see JP 2009-010817 A). In addition, there may be a case where the user covers a surface other than the detection window with a protective cover to use.

Some light curtains include an indicator lamp. The operator can visually recognize the operation state of the light curtain, the operation instruction, or the like by looking at the indicator lamp of the light curtain.

However, when an extruded metal case is employed as a part of the housing, the arrangement position of the indicator lamp may be restricted by the extruded shape of the metal case. Specifically, the extruded product has the same cross section anywhere in the extrusion direction (=longitudinal direction). Therefore, when the indicator lamp is to be disposed on the outer surface of the extruded metal case, a hole (=indicator lamp installation hole) perpendicular to the extrusion direction needs to be made in the side wall of the metal case, and additional processing is required.

Therefore, the indicator lamp of the light curtain is often incorporated in the detection window of the optical axis (for example, inside of the front cover) or disposed on the end caps at both ends formed of resin (for example, see JP 2013-218970 A).

However, when the indicator lamp is incorporated in the detection window of the optical axis, the visibility of the indicator lamp is not necessarily good.

In particular, when a bumper portion for protecting the detection window is provided, the indicator lamp is hardly visible only from the front of the detection window. Therefore, there is a possibility that an operator who tries to check the indicator lamp erroneously blocks the optical axis. In addition, in a case where the housing is small (not short and small but small in diameter), since the width of the detection window is narrow, the visibility of the indicator lamp is easily impaired.

In addition, there is also a problem when the indicator lamp is disposed in the resin molding portions at both ends. Both ends of the housing are not easily visible to a person in the first place, and may be covered with a protective cover. Therefore, it must be said that the configuration in which the indicator lamp is disposed in the resin molding units at both ends has low versatility.

There is also a light curtain in which an indicator lamp can be visually recognized from an outer surface of a transparent resin case. However, since the resin case is adopted, rigidity is sacrificed.

SUMMARY OF THE INVENTION

In view of the above problems, an object of the invention is to provide a light curtain capable of performing display with high visibility without impairing rigidity of a housing.

A light curtain according to the invention includes: for example, a housing in which one element of a pair of a light projecting element and a light receiving element forming a plurality of optical axes is disposed inside along a longitudinal direction in order to form the plurality of optical axes at intervals, the housing including a metal case extending in the longitudinal direction and end members connected to both ends of the metal case; a cover that transmits light from the light projecting element and is attached to the housing so as to cross the plurality of optical axes; an indicator lamp that is a light diffusing member disposed outside an outer surface of at least one of the cover and the housing along the longitudinal direction or formed in series with the cover; and an indicator lamp light source that is accommodated in the housing and supplies light for displaying toward the indicator lamp.

Other features, elements, steps, advantages, and characteristics will be more apparent from the following detailed description and the accompanying drawings.

According to the invention, it is possible to provide a light curtain capable of performing display with high visibility without impairing the rigidity of a housing.

BRIEF DESCRIPTION OF THE DRAWINGS

FIG. 15 is a diagram illustrating an eighth embodiment of the light projector;

FIG. 16 is a diagram illustrating a relationship between a light emission color and an operation mode;

FIG. 17 is a diagram illustrating an arrangement example of indicator lamp light sources in a ninth embodiment;

DETAILED DESCRIPTION OF PREFERRED EMBODIMENTS

<Light Curtain>

Figure 1:
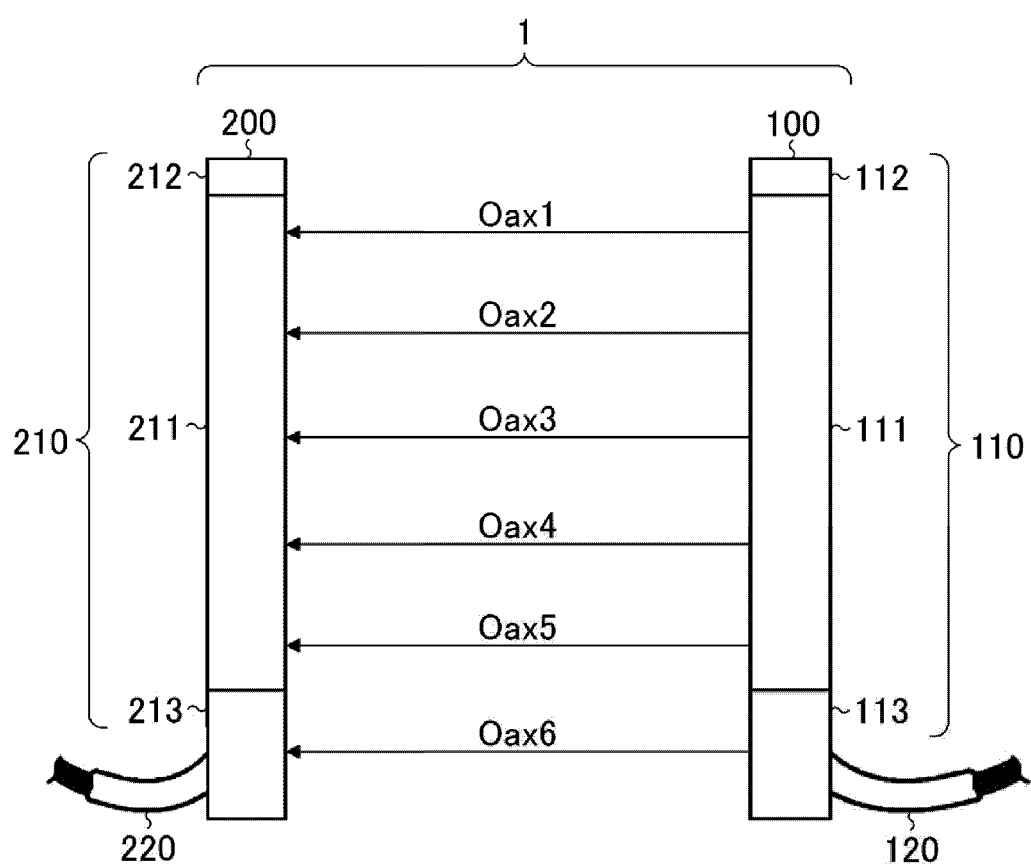
FIG. 1 is a diagram illustrating a schematic configuration of a light curtain.

FIG. 1 is a diagram illustrating a schematic configuration of a light curtain. A light curtain 1 of the present configuration example is an aspect of a multiple-optical-axis photoelectric sensor, and generally includes a pair of a light projector 100 and a light receiver 200.

The light curtain 1 detects a person or an object depending on whether at least one of a plurality of optical axes (six optical axes Oax1 to Oax6 in the drawing) formed at intervals from each other between the light projector 100 and the light receiver 200 disposed in parallel is shielded. For example, the light curtain 1 is provided at an entrance or the like of a dangerous region where a dangerous source such as a press machine is placed, and can be used as a safety device for detecting intrusion or presence of an operator.

The light projector 100 and the light receiver 200 respectively include long (up to 2 m or more) housings 110 and 210 and cables 120 and 220 connected thereto.

The housing 110 has a hollow metal case 111 extending in the longitudinal direction and hollow end caps 112 and 113 (=corresponding to end members) connected to both ends of the metal case 111, respectively. Similarly, the housing 210 includes a hollow metal case 211 extending in the longitudinal direction, and hollow end caps 212 and 213 (corresponding to end members) connected to both ends of the metal case 211, respectively. In the present embodiment, the longitudinal direction is a direction substantially parallel to a direction in which a plurality of optical axes formed between the light projector 100 and the light receiver 200 are arranged at intervals.

As described above, when the metal cases 111 and 211 having high rigidity are adopted as the cases of the housings 110 and 210, the long housings 110 and 210 are less likely to be deformed. Therefore, arrangement adjustment (for example, angle adjustment for arranging both in parallel) of the light projector 100 and the light receiver 200 becomes relatively easy. As the metal cases 111 and 211, for example, an inexpensive and lightweight aluminum extruded product may be used. In this case, the metal cases 111 and 211 all have the same cross section regardless of where in the extrusion direction (=longitudinal direction).

Each of the end caps 112, 113, 212, and 213 may be molded by injection molding using a resin material, or may be formed by die casting using a metal material such as zinc. Note that an interface with the cables 120 and 220 can be mounted on the end caps 113 and 213 on the lower side of the drawing. As such, the end caps 113 and 213 may be larger than the end caps 112 and 212 on the upper side of the drawing.

<Light Projector>

Figure 2:
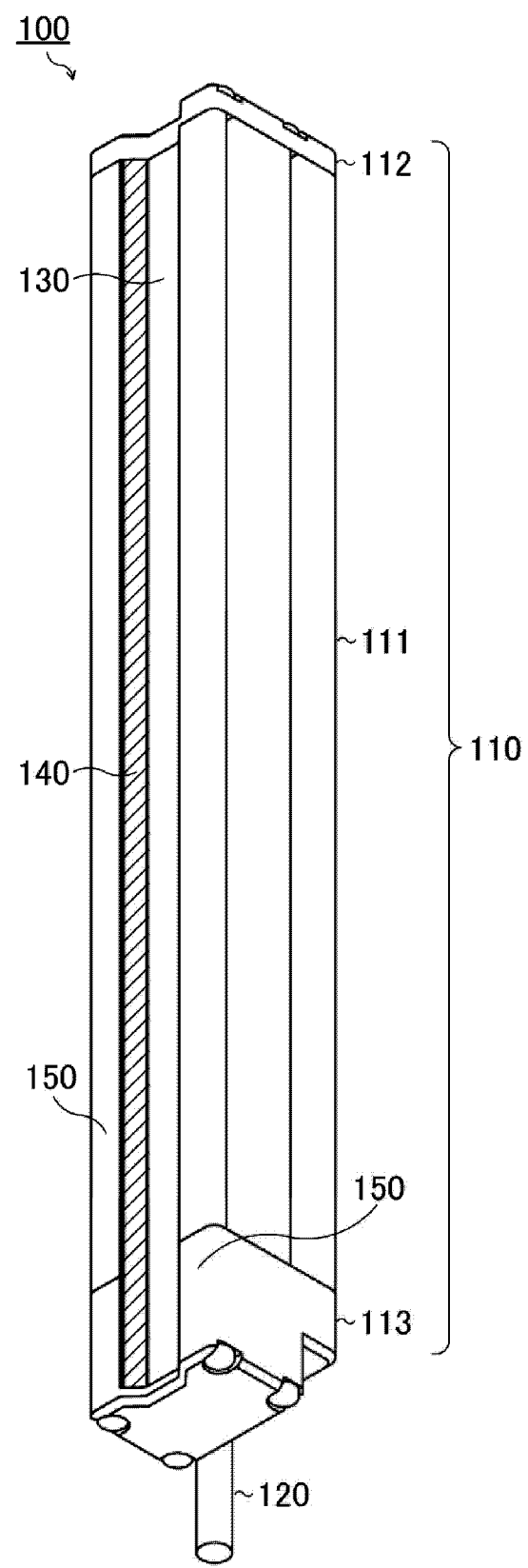
FIG. 2 is a perspective view illustrating an overall configuration of a light projector.
Figure 3:
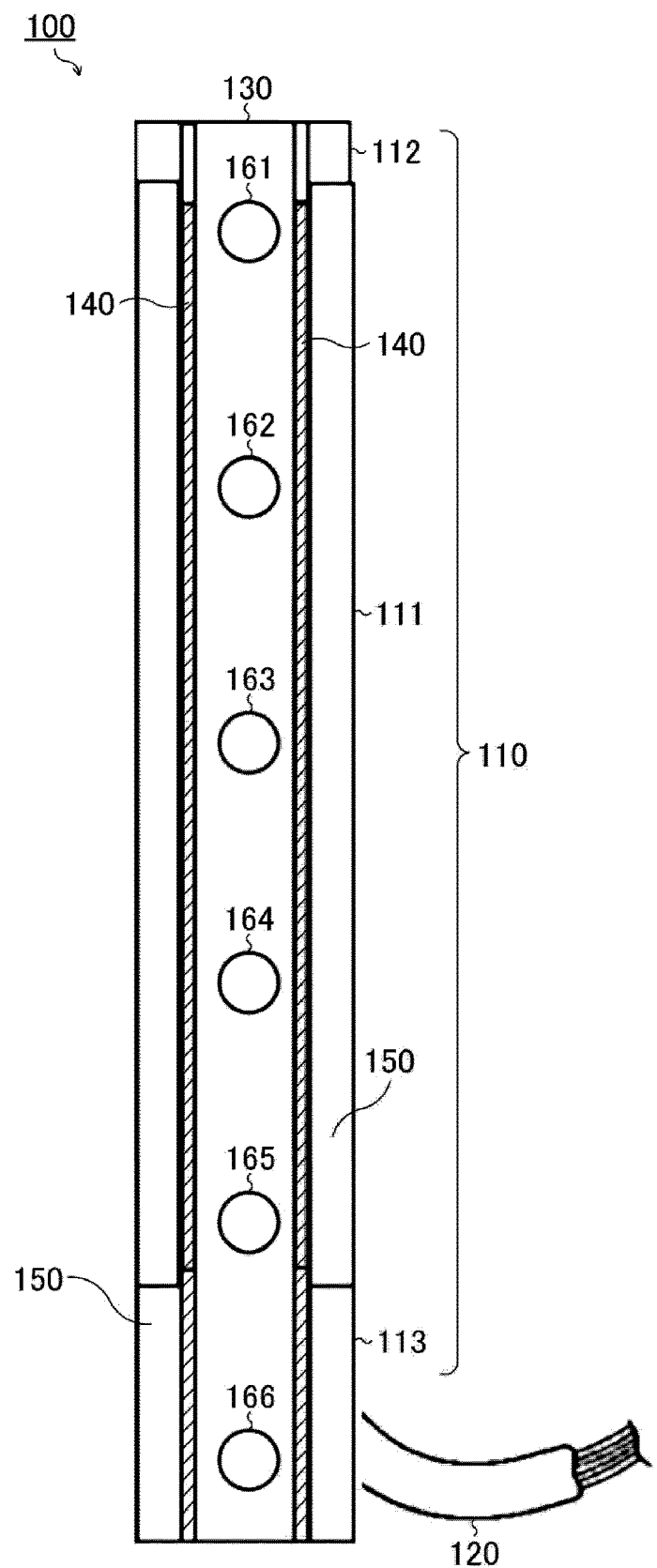
FIG. 3 is a front view illustrating an overall configuration of the light projector.
Figure 4:
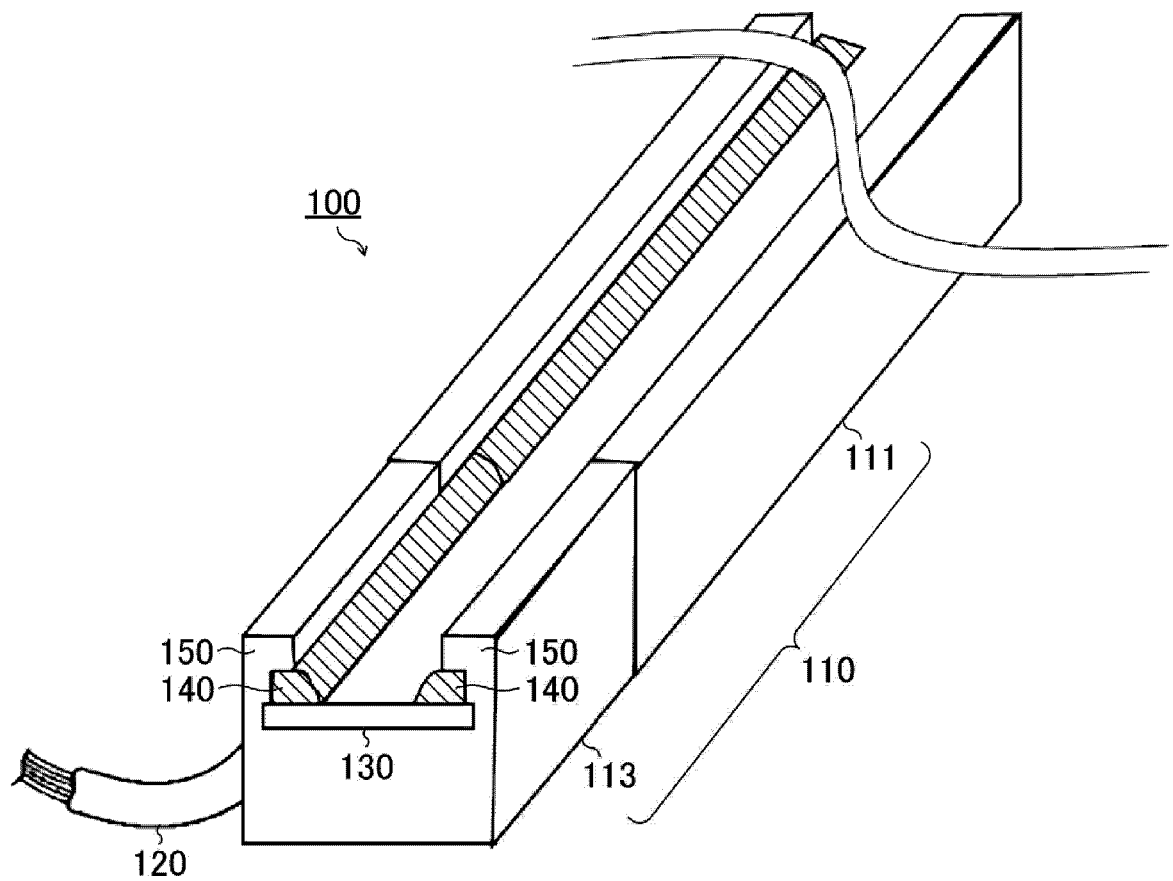
FIG. 4 is a perspective view illustrating one end of the light projector.

FIGS. 2 and 3 are a perspective view and a front view, respectively, illustrating an overall configuration of the light projector 100. FIG. 4 is a perspective view illustrating one end of the light projector 100.

As described above, the light projector 100 includes the housing 110 and the cable 120. The housing 110 includes the metal case 111 and the end caps 112 and 113. Further, the light projector 100 includes a front cover 130, an indicator lamp 140, and a bumper portion 150.

The front cover 130 is a long light transmission plate attached to cover a front opening (=detection window) of the housing 110. In the front opening of the housing 110, light projecting elements 161 to 166 for forming the plurality of optical axes Oax1 to Oax6 are disposed at equal intervals along the longitudinal direction. That is, the front cover 130 is attached to the housing 110 so as to cross the plurality of optical axes Oax1 to Oax6. The front cover 130 may be a light-transmissive resin plate (acrylic plate or the like) extruded or a glass plate. The translucency of the member used as the front cover 130 in the present embodiment refers to translucency to the extent that the light of the light projecting elements 161 to 166 forming the plurality of optical axes Oax1 to Oax6 is not excessively diffused out of the optical axis and is received by the light receiving elements 261 to 266 described later with a certain amount of light or more. As described above, since the translucent member is used for the front cover 130, the operator can visually recognize the light projecting elements 161 to 166 through the front cover 130.

A light projecting element (the light projecting element 166 in FIG. 3) corresponding to at least one optical axis among the plurality of optical axes Oax1 to Oax6 is preferably disposed in the end cap 113. That is, the light projecting elements 161 to 166 may be disposed at equal intervals in the longitudinal direction over the entire region from one end to the other end of the light projector 100. Further, the cable 120 may extend from the back surface (or side surface) of the end cap 113 instead of extending from the lower surface of the end cap 113. According to such a configuration, the light projector 100 can be installed close to the installation surface (floor surface or the like). Therefore, dead space-less can be realized.

The indicator lamp 140 is controlled to be turned on and off with a light emission color corresponding to, for example, an operation state of the light curtain 1 (an optical axis detection state, a self-diagnosis result, or the like) or an operation instruction regarding putting in and taking out an object. That is, the indicator lamp 140 functions as an operation indicator lamp or a work instruction lamp. Therefore, the operator can visually recognize the operation state or the operation instruction of the light curtain 1 by looking at the indicator lamp 140 of the light curtain 1.

In particular, the indicator lamp 140 is disposed outward from the outer surface of at least one of the front cover 130 and the housing 110 along the longitudinal direction, or is formed in series with the front cover 130 (details of the structure will be described later). In this drawing, the indicator lamp 140 is provided on both sides of the front cover 130. With the indicator lamp 140 disposed or formed in this manner, it is possible to perform display with high visibility without impairing the rigidity of the housing 110. More specifically, the indicator lamp 140 is a long extruded product, and is disposed such that the longitudinal direction of the indicator lamp 140 is along the longitudinal direction of the housing 110. Note that the indicator lamp 140 only needs to be disposed along the longitudinal direction of the housing 110, and the method of manufacturing the indicator lamp is not limited to extrusion molding, and the shape of the indicator lamp 140 may not be an elongated shape. For example, a plurality of members functioning as the indicator lamp 140 may be disposed along the longitudinal direction of the housing 110.

The indicator lamp 140 is a light diffusing member that diffuses light incident from an indicator lamp light source 170 (not illustrated) accommodated in the housing 110 in various directions. More specifically, the indicator lamp 140 contains a light diffuser that diffuses light in various directions. In the configuration in which the light diffusing member as the indicator lamp 140 contains the light diffuser, the indicator lamp 140 can be lit relatively uniformly even when the number of the indicator lamp light sources 170 is small with respect to the size of the surface of the indicator lamp 140, so that display with high visibility can be performed. In the present embodiment, the indicator lamp 140 is milky white because it is made of a transparent resin to which fine particles are added. When the base resin is not transparent but has a specific color, the specific color and milky white are mixed. When the indicator lamp 140 is made of a milky white resin (silicone or the like) in addition to the configuration containing the light diffuser, it is possible to obtain an action of relatively uniformly illuminating the indicator lamp 140. The light diffusing member as the indicator lamp 140 may be a member that diffuses the light from the indicator lamp light source 170 so that the light can be visually recognized from more directions, or a member that diffuses the light from the indicator lamp light source 170 to such an extent that it is difficult to visually recognize the contour of the indicator lamp light source 170 from the outside of the indicator lamp 140. For example, a light diffusing member having a surface processed to diffuse light from the indicator lamp light source 170 may be disposed as the indicator lamp 140. As surface processing for diffusing light, for example, emboss processing is known. According to the configuration in which the light diffusing member having a processed surface is disposed as the indicator lamp 140, when a region in which light is relatively easily diffused and a region in which light is relatively less easily diffused are provided in one member, it is easy to manufacture such a member.

The bumper portion 150 protrudes outward from a region of the outer surface of the front cover 130 that intersects with the plurality of optical axes Oax1 to Oax6, and is disposed along the longitudinal direction of the housing 110 (details of the structure will be described later).

In this drawing, a pair of bumper portions 150 is formed so as to protrude from both sides of the front cover 130. That is, the front cover 130 is disposed in a narrow valley sandwiched between a pair of bumper portions 150 (twin bumpers proposed by the applicant of the present application) positioned on both sides thereof and protruding forward. Therefore, even if the object collides with the front surface of the light projector 100, the impact is received by the bumper portion 150. Therefore, the front cover 130 is less likely to be damaged. The bumper portion 150 may be made of a hard material such as metal.

The configuration of the light receiver 200 is basically similar to the configuration of the light projector 100. Therefore, in the description of FIGS. 2 to 4, the configuration of the light receiver 200 can be understood by appropriately replacing the light projector 100 and the light projecting elements 161 to 166 with the light receiver 200 and the light receiving elements 261 to 266, respectively, and appropriately replacing the reference numerals of the other 100 series with the reference numerals of the 200 series. The same applies to the following description.

<Functional Block>

Figure 5:
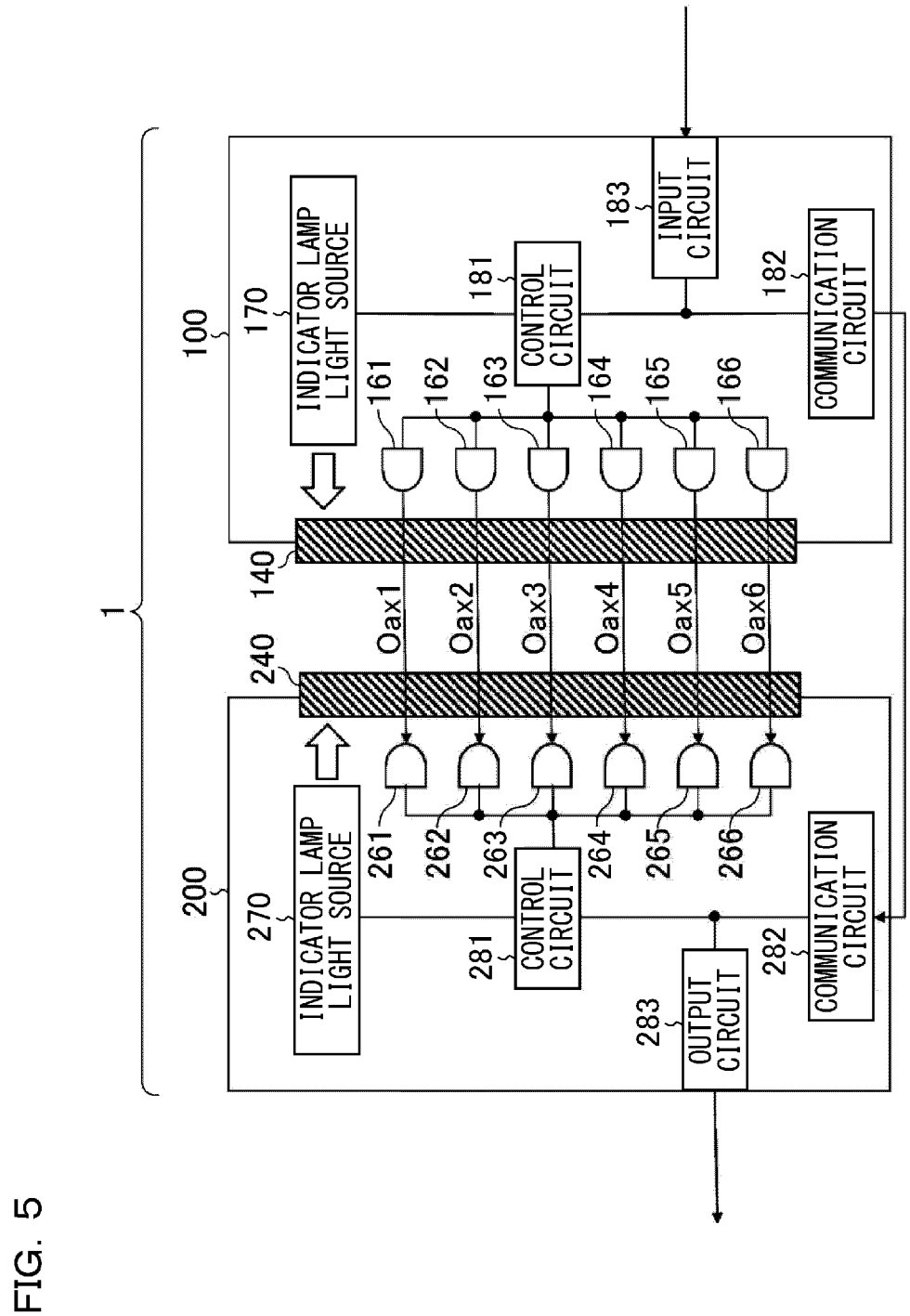
FIG. 5 is a functional block diagram of a light curtain.

FIG. 5 is a functional block diagram of the light curtain 1. In the light curtain 1 of the present configuration example, the light projector 100 includes an indicator lamp 140, light projecting elements 161 to 166, an indicator lamp light source 170, a control circuit 181, a communication circuit 182, and an input circuit 183.

The light projecting elements 161 to 166 are disposed at equal intervals at a predetermined pitch along the longitudinal direction of the light projector 100. The light projecting elements 161 to 166 sequentially projects a plurality of light beams for forming the plurality of optical axes Oax1 to Oax6 toward the light receiver 200 (in particular, the light receiving elements 261 to 266) in a time division manner on the basis of the light projection control signal input from the control circuit 181. Note that the light projecting elements 161 to 166 may be, for example, a light emitting diode that emits infrared light.

The indicator lamp light source 170 supplies light for display toward the indicator lamp 140 on the basis of a display control signal input from the control circuit 181. The indicator lamp light source 170 may be switchable between a plurality of light emission colors (e.g. red, green, and orange) in accordance with an operation state of the light curtain 1, an operation instruction, or the like.

Note that the indicator lamp light source 170 is preferably pulse-lit at a timing temporally offset from the light projection/light reception timing of each of the plurality of optical axes Oax1 to Oax6. According to such turn-on and turn-off control, interference with optical axis detection by the indicator lamp light source 170 can be suppressed.

The indicator lamp 140 diffuses light incident from the indicator lamp light source 170 in various directions. The operator can visually recognize the operation state of the light curtain 1, the operation instruction, or the like by looking at the indicator lamp 140.

In response to an instruction from the light receiver 200, the control circuit 181 generates a light projection control signal so as to sequentially drive the light projecting elements 161 to 166 in a time division manner. Further, the control circuit 181 generates a display control signal so as to turn on and off the indicator lamp light source 170 in an arbitrary light emission color. Furthermore, the control circuit 181 exchanges various types of information with the communication circuit 182 and the input circuit 183.

The communication circuit 182 performs wired or wireless communication with the light receiver 200 (in particular, the communication circuit 282). For example, the communication circuit 182 receives an input of information regarding an operation state (an optical axis detection state, a self-diagnosis result, and the like) of the light curtain 1 from the light receiver 200 and transmits the information to the control circuit 181.

The input circuit 183 performs wired or wireless communication with an external device (for example, a safety controller). For example, the input circuit 183 receives an input of an operation instruction related to taking in and out of an object from an external device and transmits the operation instruction to the control circuit 181.

On the other hand, the light receiver 200 includes an indicator lamp 240, light receiving elements 261 to 266, an indicator lamp light source 270, a control circuit 281, a communication circuit 282, and an output circuit 283.

The light receiving elements 261 to 266 are disposed at equal intervals at the same pitch as the light projecting elements 161 to 166 along the longitudinal direction of the light receiver 200. The light receiving elements 261 to 266 sequentially receive a plurality of light beams for forming the plurality of optical axes Oax1 to Oax6 in a time division manner based on axes light reception control signal input from the control circuit 281. Note that the light receiving elements 261 to 266 may be, for example, a photodiode that outputs an electric signal corresponding to the amount of received infrared light.

The indicator lamp light source 270 supplies light for display toward the indicator lamp 240 on the basis of a display control signal input from the control circuit 281. Similarly to the indicator lamp light source 170, the indicator lamp light source 270 may be switching a plurality of light emission colors (e.g. red, green, and orange) according to an operation state or an operation instruction of the light curtain 1.

Note that the indicator lamp light source 270 is preferably pulse-lit at a timing temporally offset from the light projection/light reception timing of each of the plurality of optical axes Oax1 to Oax6. According to such turn-on and turn-off control, interference with optical axis detection by the indicator lamp light source 270 can be suppressed.

In addition, a case where the indicator lamp light source 270 is continuously turned on will be considered. In this case, it is desirable that a saturation prevention circuit (=a subtraction circuit for a DC component) is provided so that the electrical signals output from the light receiving elements 261 to 266 are not saturated even if the direct current light from the indicator lamp light source 270 is received by the light receiving elements 261 to 266.

The indicator lamp 240 diffuses light incident from the indicator lamp light source 270 in various directions. The operator can visually recognize the operation state of the light curtain 1, the operation instruction, or the like by looking at the indicator lamp 240.

In addition, since the indicator lamps 140 and 240 are provided on both the light projector 100 and the light receiver 200, respectively, display with high visibility can be performed. However, one of the indicator lamps 140 and 240 may be omitted.

The control circuit 281 generates a light reception control signal so as to sequentially enable the light receiving elements 261 to 266 in a time division manner in synchronization with the drive timing of each light projecting elements 161 to 166. Further, the control circuit 281 generates a display control signal so as to turn on and off the indicator lamp light source 270 in an arbitrary light emission color. Furthermore, the control circuit 281 exchanges various types of information with the communication circuit 282 and the output circuit 283.

In addition, the control circuit 281 monitors the light incident state/light shielding state of each of the plurality of optical axes Oax1 to Oax6. For example, the control circuit 281 may output an operation permission signal (ON signal) when all of the plurality of optical axes Oax1 to Oax6 are in the light incident state. On the other hand, the control circuit 281 may output an operation non-permission signal (OFF signal) when at least one of the plurality of optical axes Oax1 to Oax6 is in the light shielding state.

Further, the control circuit 281 may have a function of self-diagnosing whether the light incident state/light shielding state of each of the plurality of optical axes Oax1 to Oax6 can be correctly monitored. As a method of self-diagnosis, for example, the control circuit 281 and the output circuit 283 (for example, an output signal switching device (OSSD) output) may be multiplexed, and matching/mismatching of the multiplexed signals may be determined.

For example, when the multiplexed signals coincide with each other, OK diagnosis (=a diagnosis result indicating that the signals can be correctly monitored) is made. On the other hand, when the multiplexed signals do not coincide with each other, NG diagnosis (=a diagnosis result indicating that it is not a state in which correct monitoring can be performed) is made. When the NG diagnosis is made, the operation non-permission signal (OFF signal) may be output regardless of the light incident state of each of the plurality of optical axes Oax1 to Oax6.

Note that information that can be used for safety control is safety information, and general information that cannot be used for safety control is non-safety information. For example, the OSSD output is one piece of safety information. The signal used for the turn-on/off control of each of the indicator lamp light sources 170 and 270 may be a signal indicating safety information or a signal indicating non-safety information.

The communication circuit 282 performs wired or wireless communication with the light projector 100 (in particular, the communication circuit 182). For example, the communication circuit 282 receives an input of information regarding an operation state (an optical axis detection state, a self-diagnosis result, and the like) of the light curtain 1 from the control circuit 281 and transmits the input information to the light projector 100.

The output circuit 283 performs wired or wireless communication with an external device (for example, a safety controller). For example, the output circuit 283 receives an input of an operation state (such as an optical axis detection state and a self-diagnosis result) of the light curtain 1 from the control circuit 281 and transmits the input to an external device.

First Embodiment

Figure 6:
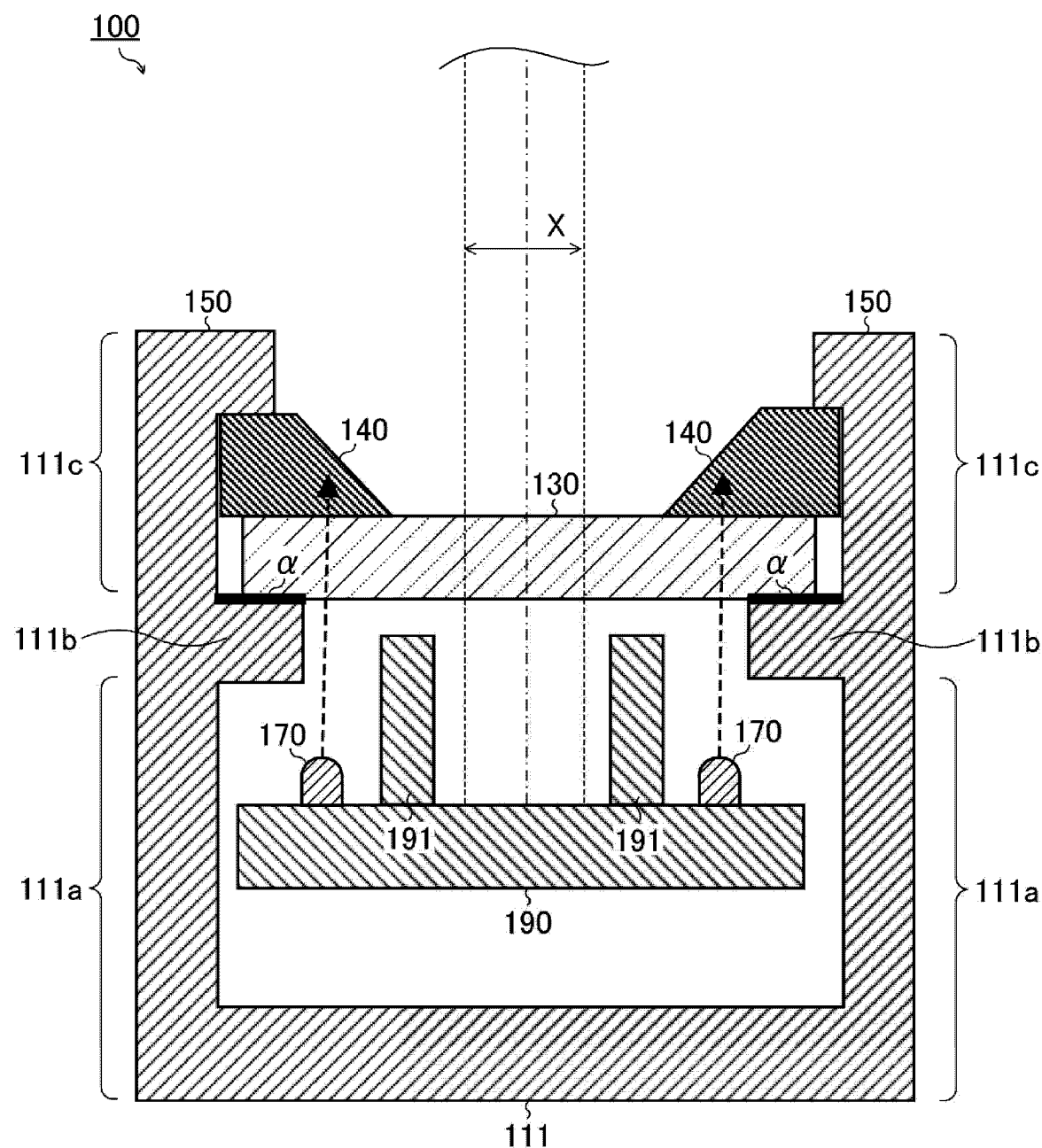
FIG. 6 is a diagram illustrating a first embodiment of the light projector.

FIG. 6 is a diagram (=a schematic cross-sectional view when the metal case 111 of the light projector 100 is cut at an arbitrary position in the longitudinal direction) illustrating the first embodiment of the light projector 100. The light projector 100 of the present embodiment includes a housing 110 (only the metal case 111 is illustrated in the drawing), a front cover 130, an indicator lamp 140, a bumper portion 150, an indicator lamp light source 170, a substrate 190, and a light shielding plate 191.

The metal case 111 is an extruded product extending in the longitudinal direction of the light projector 100. In accordance with the present drawing, the metal case 111 includes a main body 111a, a pair of first protruding stripes 111b, and a pair of second protruding stripes 111c.

The main body 111a is a hollow member having a U-shaped cross section with an opening on the upper side in the plane of drawing (=the front side of the light projector 100). The indicator lamp light source 170, the substrate 190, and the light shielding plate 191 are accommodated in the internal space of the main body 111a.

The pair of first protruding stripes 111b protrudes from inner side surfaces of the left side wall and the right side wall of the main body 111a toward the inside of the opening. That is, the pair of first protruding stripes 111b is disposed so as to face each other with a predetermined interval, sandwiching the optical axis intersecting region X (=a region intersecting the plurality of optical axes Oax1 to Oax6). The pair of first protruding stripes 111b functions as cover attachment portions for supporting the front cover 130. As described above, a light-transmissive member is used for the front cover 130 as long as the light-transmissive member is provided at least in an optical axis intersecting region X and the optical axes Oax1 to Oax6 are not hindered. For example, in the present embodiment, the portion in contact with the pair of first protruding stripes 111b does not necessarily have translucency.

The pair of second protruding stripes 111c extends further upward in the drawing from upper ends of the left side wall and the right side wall of the main body 111a. In addition, each of the pair of second protruding stripes 111c has a distal end portion bent toward the inside of the opening. The pair of second protruding stripes 111c functions as the bumper portion 150 for protecting the front cover 130. That is, in the present embodiment, the bumper portion 150 described above is formed of the metal case 111. Therefore, the fastness of the light projector 100 can be enhanced.

The front cover 130 is supported (suspended) at both ends across the pair of first protruding stripes 111b. The front cover 130 passes light forming the plurality of optical axes Oax1 to Oax6 in the optical axis intersecting region X. Between the front cover 130 and the pair of first protruding stripes 111b (see the thick line α), treatment for improving liquid resistance is performed. For example, a process of disposing a packing and bonding with a liquid-resistant adhesive is performed. As described later, since adhesion between the front cover 130 and the first protruding stripe 111b is enhanced by the indicator lamp 140, liquid resistance is further improved.

The indicator lamp 140 is disposed on both sides of the front cover 130 adjacent to the bumper portion 150. In accordance with this drawing, the indicator lamp 140 is disposed along the longitudinal direction of the light projector 100 in a region sandwiched between the first protruding stripe 111b and the distal end portion (bent portion) of the second protruding stripe 111c, that is, in a region sandwiched between the bumper portion 150 and the front cover 130.

The indicator lamp 140 diffuses light incident from the indicator lamp light source 170 through the front cover 130 in various directions. For example, the indicator lamp 140 may have a taper for refracting and diffusing the light incident from the indicator lamp light source 170 toward the inside of the opening.

With the indicator lamp 140 disposed in this manner, it is easy to see even from the side of the light projector 100. Therefore, in the small (small diameter) light curtain 1 using the metal case 111, it is possible to perform display with high visibility without impairing the rigidity of the housing 110. In particular, in a case where the pair of bumper portions 150 is provided so as to protrude to both sides of the front cover 130, the effect of improving the visibility by the above arrangement can be more remarkable.

Further, in the light projector 100 of the present embodiment, the indicator lamp 140 also functions as a pressing member for pressing and fixing the front cover 130 downward (=in the direction toward the first protruding stripe 111b). Therefore, since the adhesion between the front cover 130 and the first protruding stripe 111b is enhanced, liquid resistance can be improved by preventing liquid from entering the inside of the metal case 111. In order for the indicator lamp 140 to have a function as a pressing member, it is desirable that the indicator lamp 140 has appropriate elasticity.

The indicator lamp light source 170 is mounted on a main surface (=a surface facing the front cover 130) of the substrate 190. The indicator lamp light source 170 supplies light for display toward the indicator lamp 140 via the front cover 130. In this drawing, the light emitted from the indicator lamp light source 170 passes between the pair of first protruding stripes 111b without being blocked by the pair of first protruding stripes 111b, and is supplied to the indicator lamp 140 through the front cover 130.

The number of the indicator lamp light sources 170 is not limited. For example, a plurality of the indicator lamp light sources 170 may be intermittently disposed or formed in series along the longitudinal direction of the light projector 100.

The indicator lamp light source 170 may include a lens for controlling the direction of the emitted light. For example, an optically designed lens may be provided so as to reduce the spread angle of light in the left-right direction of the drawing and to increase the spread angle of light in the depth direction of the drawing. According to such a lens, it is possible to reduce the number of indicator lamp light sources 170 while suppressing interference with the plurality of optical axes Oax1 to Oax6.

The type of lens may be a point symmetrical lens (single lens arrangement) or a cylindrical lens (series arrangement by extrusion molded product).

The light shielding plate 191 is provided between the indicator lamp light source 170 and the optical axis intersecting region X. Therefore, since the light from the indicator lamp light source 170 toward the optical axis intersecting region X is blocked, the light emitted from the indicator lamp light source 170 is less likely to interfere with the plurality of optical axes Oax1 to Oax6.

A case where the optical axes Oax1 to Oax6 are formed of infrared light, and visible light (red light, green light, orange light, or the like) is emitted from the indicator lamp light source 170 is considered. In this case, a filter that transmits infrared light and blocks visible light may be provided in the light receiver 200. In particular, when the indicator lamp 240 is provided in the light receiver 200, a filter that transmits infrared light and blocks visible light may be disposed so as not to block the display of the indicator lamp 240, and the filter may be provided in the light receiving elements 261 to 266 or may be provided in a lens that guides light to the light receiving elements 261 to 266.

Second Embodiment

Figure 7:
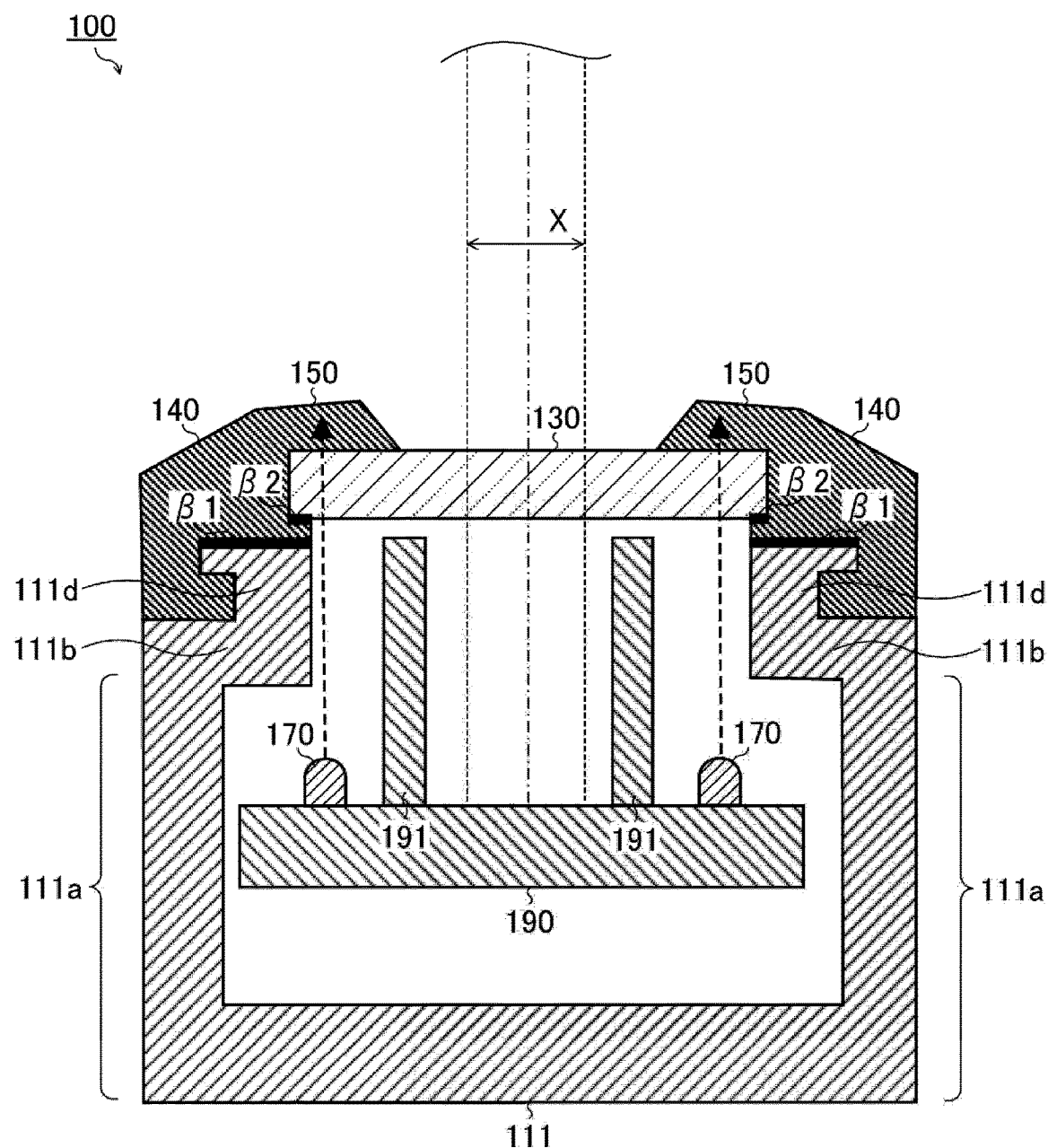
FIG. 7 is a diagram illustrating a second embodiment of the light projector.

FIG. 7 is a diagram illustrating a second embodiment of the light projector 100. In the light projector 100 of the present embodiment, the bumper portion 150 is formed not by the metal case 111 but by the indicator lamp 140 based on the above-described first embodiment (FIG. 6). In other words, the bumper portion 150 also serves as the indicator lamp 140.

In accordance with the present drawing, the metal case 111 includes a pair of locking stripes 111d instead of the pair of second protruding stripes 111c. The pair of locking stripes 111d extends upward in the plane of drawing from the distal end portions of the pair of first protruding stripes 111b. In addition, each of the pair of locking stripes 111d has a distal end portion bent toward the outside of the metal case 111. A treatment for improving liquid resistance is performed between the indicator lamp 140 and the metal case 111 (see the thick linen) and between the indicator lamp 140 and the front cover 130 (see the thick line 82).

The bumper portion 150 is attached to the outer side of the metal case 111 (=upper end portions of the left side wall and the right side wall) so as to be fitted into the pair of locking stripes 111d.

Further, in the bumper portion 150, notched grooves facing each other with an opening of the metal case 111 interposed therebetween are formed. The front cover 130 is supported by the bumper portion 150 such that both ends of the front cover are fitted into the notched grooves. In this manner, the bumper portion 150 also functions as a cover attachment portion.

Apart of the bumper portion 150 protrudes toward the upper side in the plane of drawing (=the front side of the light projector 100) from the front cover 130 (particularly, the optical axis intersecting region X). Therefore, the bumper portion 150 can protect the front cover 130 from impact as an original function.

In addition, as described above, the bumper portion 150 also serves as the indicator lamp 140, and diffuses light incident from the indicator lamp light source 170 through the front cover 130 in various directions. For example, the indicator lamp 140 may have a taper for refracting and diffusing the light incident from the indicator lamp light source 170 toward the inside of the opening. Further, for example, the indicator lamp 140 may be molded in a multifaceted shape such that light incident from the indicator lamp light source 170 is diffused toward the front surface or the outer surface of the light projector 100.

As described above, with the configuration in which the bumper portion 150 also serves as the indicator lamp 140, it is possible to perform display with high visibility even when the light projector 100 is viewed from any direction.

Third Embodiment

Figure 8:
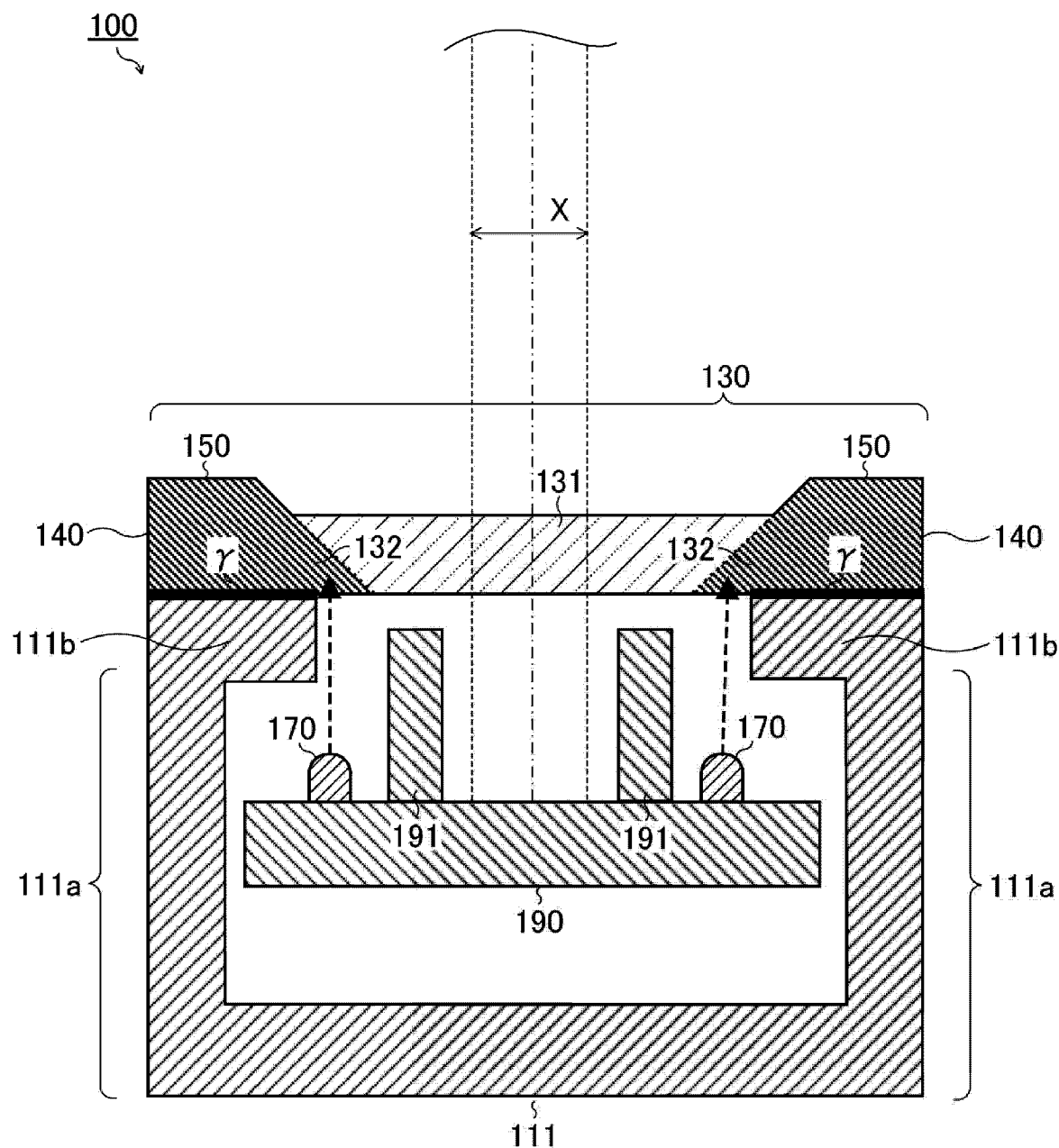
FIG. 8 is a diagram illustrating a third embodiment of the light projector.

FIG. 8 is a diagram illustrating a third embodiment of the light projector 100. In the light projector 100 of the present embodiment, the indicator lamp 140 and the bumper portion 150 are formed as a part (both end portions) of the front cover 130 based on the above-described first embodiment (FIG. 6). In other words, a part of the front cover 130 also serves as the indicator lamp 140 and the bumper portion 150.

According to this drawing, the metal case 111 does not include the second protruding stripe 111c described above, and the front cover 130 is attached so as to cover the entire front surface of the metal case 111. A treatment for improving liquid resistance is performed between the metal case 111 and the front cover 130 (see the thick line γ). Note that the front cover 130 is preferably molded in two colors (or multicolor molding) such that a detection window region 131 at the central portion and indicator lamp regions 132 at both ends have different colors.

The detection window region 131 is an optical axis intersecting region X crossing the plurality of optical axes Oax1 to Oax6 and a peripheral region thereof. Therefore, the detection window region 131 may be molded with a light-transmissive material, that is, a color that does not hinder transmission of the plurality of optical axes Oax1 to Oax6.

On the other hand, the indicator lamp region 132 is a region that does not interfere with the plurality of optical axes Oax1 to Oax6, and functions as the indicator lamp 140 described above. Therefore, the indicator lamp region 132 may be molded in a color (for example, milky white) in which light incident from the indicator lamp light source 170 is diffused in various directions. The boundary surface between the detection window region 131 and the indicator lamp region 132 may have a taper for refracting and diffusing the light incident from the indicator lamp light source 170 toward the inside of the opening.

Further, the indicator lamp region 132 is raised toward the upper side of the detection window region 131 in the drawing (=the front side of the light projector 100). That is, the indicator lamp region 132 functions as the bumper portion 150 for protecting the detection window region 131 from impact.

As described above, when the indicator lamp 140 and the bumper portion 150 are formed in series with the front cover 130, and the bumper portion 150 also serves as the indicator lamp 140, it is possible to perform display with high visibility even when the light projector 100 is viewed from any direction.

Fourth Embodiment

Figure 9:
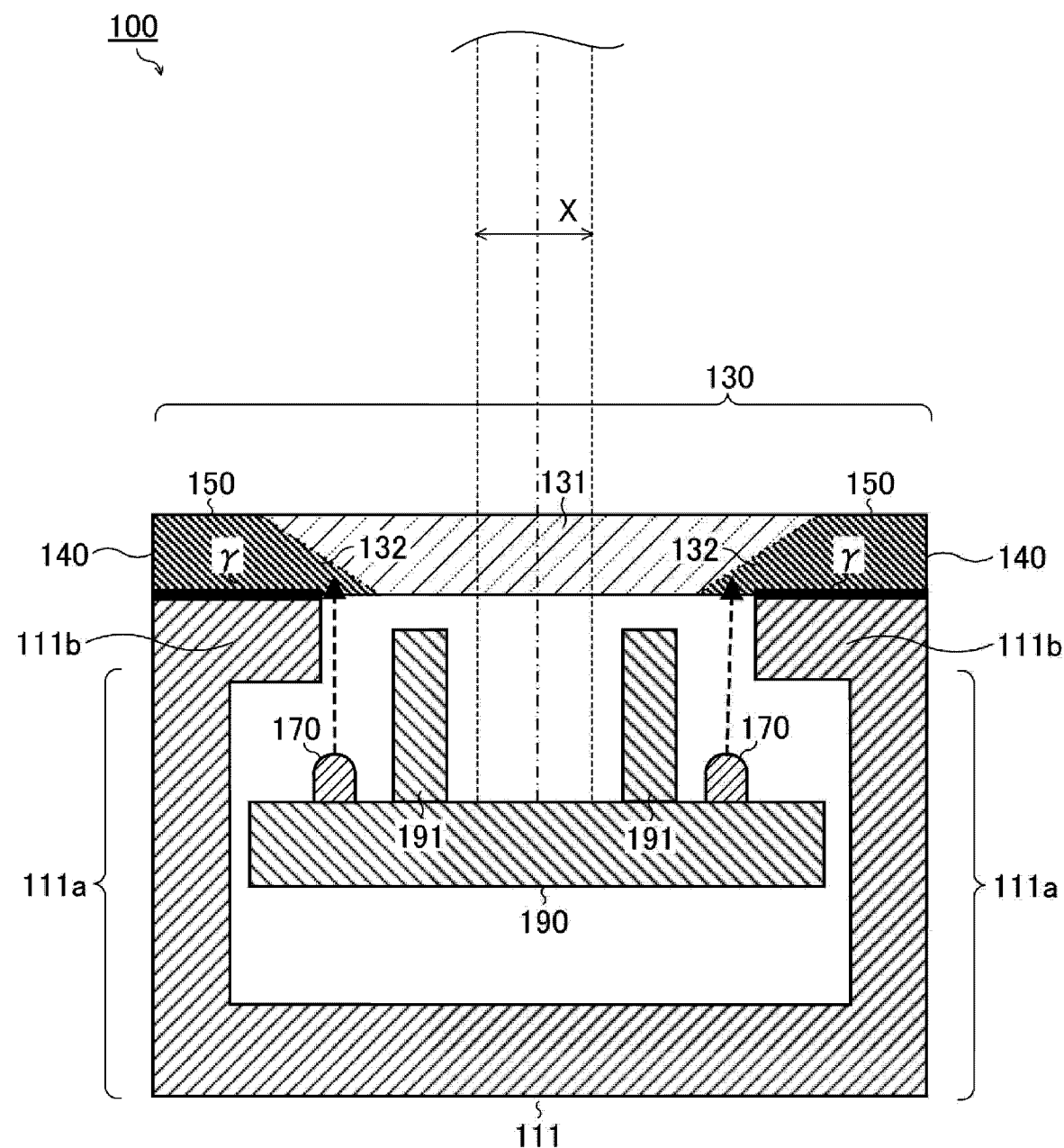
FIG. 9 is a diagram illustrating a fourth embodiment of the light projector.

FIG. 9 is a diagram illustrating a fourth embodiment of the light projector 100. In the light projector 100 of the present embodiment, both end portions of the front cover 130 are flat without protruding toward the front surface of the light projector 100 based on the above-described third embodiment (FIG. 8). In other words, the bumper portion 150 described above is omitted.

Even if the bumper portion 150 is omitted, display with high visibility can be performed as long as the indicator lamp 140 is formed in series with the front cover 130. That is, the bumper portion 150 is merely means for protecting the front cover 130 (in particular, the detection window region 131), and is not an essential component as means for enhancing the visibility of the indicator lamp 140.

Figure 10:
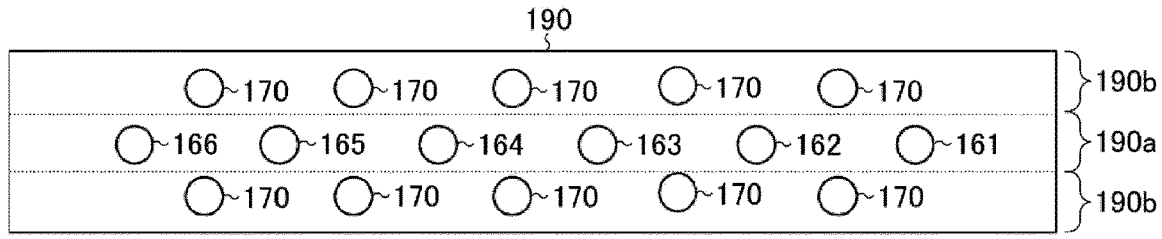
FIG. 10 is a diagram illustrating an arrangement example of indicator lamp light sources in the first to fourth embodiments.

FIG. 10 is a diagram illustrating an arrangement example of the indicator lamp light sources 170 according to the first to fourth embodiments. As illustrated in the drawing, the light projecting elements 161 to 166 may be disposed at equal intervals along the longitudinal direction of the substrate 190 in a central region 190a of the substrate 190. On the other hand, the indicator lamp light sources 170 may be disposed at equal intervals along the longitudinal direction of the substrate 190 in an end region 190b of the substrate 190.

In particular, the light projecting elements 161 to 166 and the indicator lamp light source 170 may be disposed such that the positions in the longitudinal direction of the substrate 190 are shifted from each other (staggered). According to such an arrangement example, mutual interference between the light projecting elements 161 to 166 and the indicator lamp light source 170 is suppressed.

The number and arrangement of the indicator lamp light sources 170 are not limited to the arrangement example in this drawing. For example, the number of the indicator lamp light sources 170 may be reduced so that the light supplied to the indicator lamp 140 has some unevenness.

Fifth Embodiment

Figure 11:
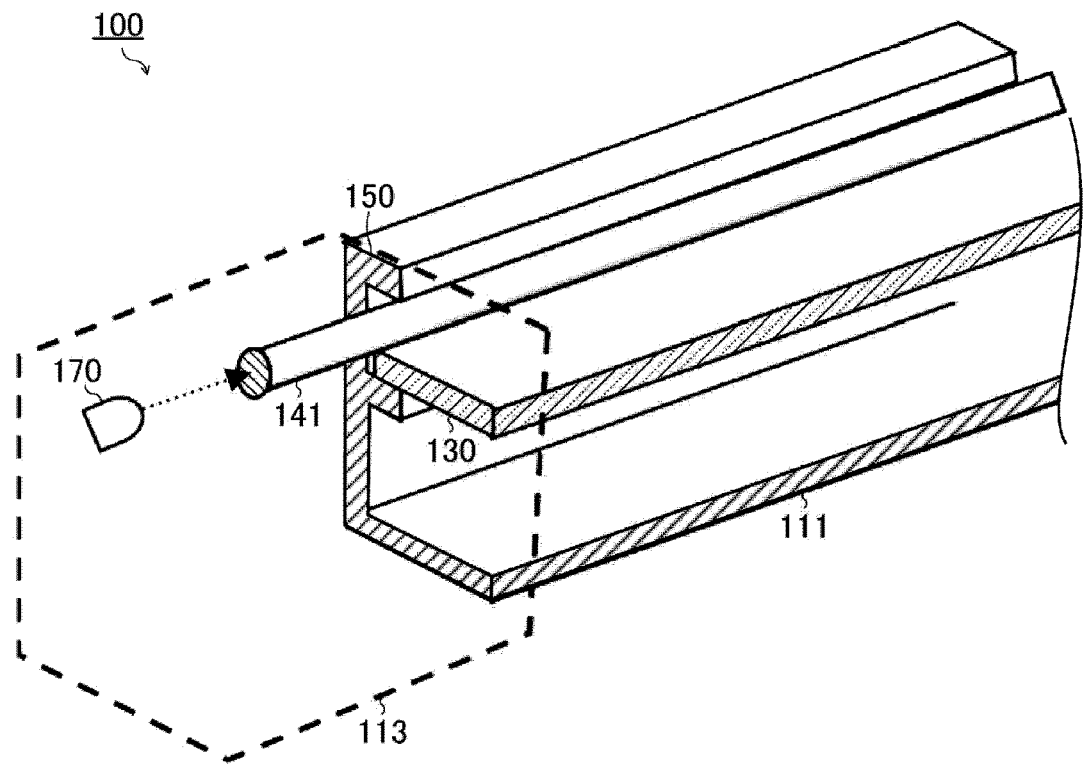
FIG. 11 is a diagram illustrating a fifth embodiment of the light projector.

FIG. 11 is a diagram illustrating a fifth embodiment of the light projector 100. In the light projector 100 of the present embodiment, a side emission type guiding optical fiber 141 which is a light diffusing member is used as the indicator lamp 140 based on the above-described first embodiment (FIG. 6).

In view of the drawing, the guiding optical fiber 141 is laid from the end cap 113 toward the metal case 111 along the longitudinal direction of the light projector 100 in a region sandwiched between the bumper portion 150 and the front cover 130.

The indicator lamp light source 170 is accommodated in at least one of the end caps 112 and 113 (only the end cap 113 is illustrated in the drawing). The light emitted from the indicator lamp light source 170 may enter from the terminal surface of the guiding optical fiber 141. As described above, the light supply system (so-called end light incident system) of the fifth embodiment is different from the light supply methods (so-called side light incident system) of the first to fourth embodiments. Power supply to the indicator lamp light source 170 may be performed from a power supply circuit (not illustrated) accommodated in the metal case 111.

When the indicator lamp light source 170 is accommodated in the end caps 112 and 113, translucent resin molded products may be used as the end caps 112 and 113. With such a configuration, the end caps 112 and 113 can also have a function as an indicator lamp. Therefore, display with higher visibility can be performed.

Figure 12:
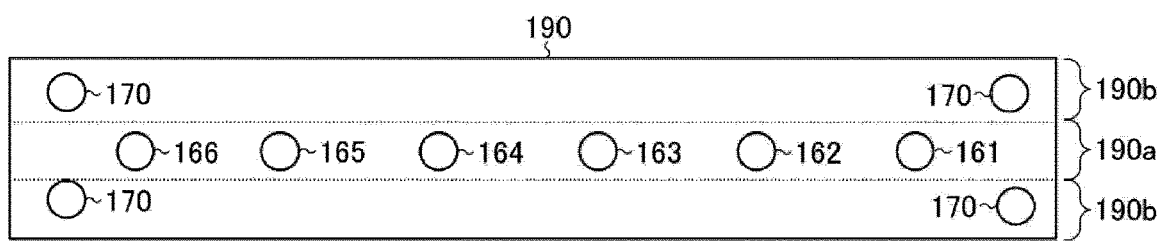
FIG. 12 is a diagram illustrating an arrangement example of indicator lamp light sources in the fifth embodiment.

FIG. 12 is a diagram illustrating an arrangement example of the indicator lamp light source 170 according to the fifth embodiment. As shown in this drawing, in the case of the fifth embodiment of the end light incident system, it is sufficient to provide the indicator lamp light source 170 at least at one end portion (both end portions in this drawing) in the longitudinal direction of the substrate 190. Therefore, the number of indicator lamp light sources 170 can be reduced.

Sixth Embodiment

Figure 13:
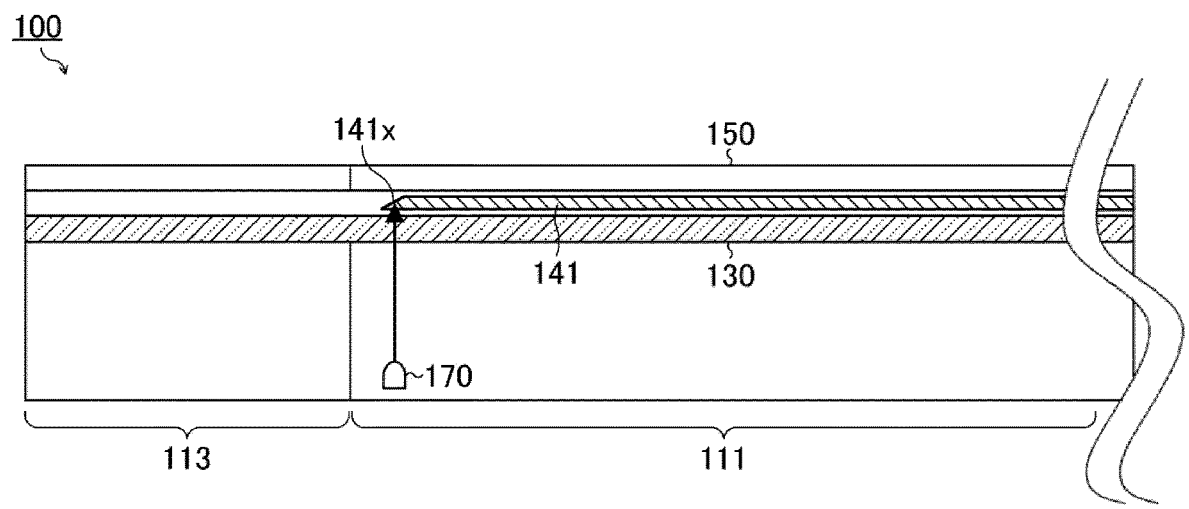
FIG. 13 is a diagram illustrating a sixth embodiment of the light projector.

FIG. 13 is a diagram illustrating a sixth embodiment of the light projector 100. In the light projector 100 of the present embodiment, the indicator lamp light source 170 is accommodated not in the end cap 113 but in the metal case 111 based on the above-described fifth embodiment (FIG. 11). In addition, the guiding optical fiber 141 do not extend to the end cap 113, and a reflection plane 141x is formed at the terminal end thereof. The reflection plane 141x is machined to receive light supplied from the side of the guiding optical fiber 141 from the indicator lamp light source 170 through the front cover 130 and guide the light to the inside of the guiding optical fiber 141. Thus, the indicator lamp light source 170 is not necessarily accommodated in the end cap 113.

Seventh Embodiment

Figure 14:
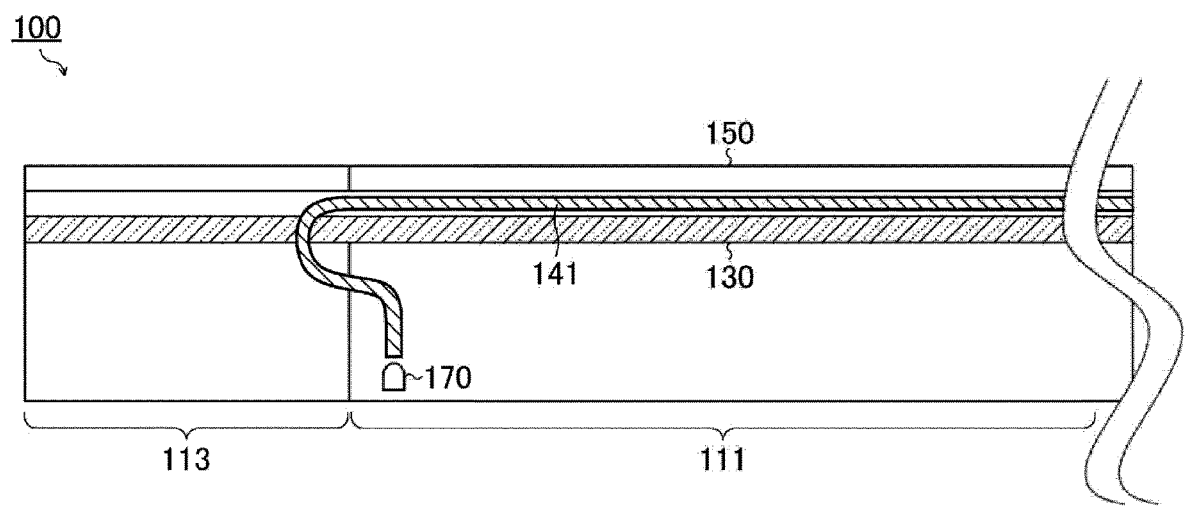
FIG. 14 is a diagram illustrating a seventh embodiment of the light projector.

FIG. 14 is a diagram illustrating a seventh embodiment of the light projector 100. In the light projector 100 of the present embodiment, the indicator lamp light source 170 is accommodated not in the end cap 113 but in the metal case 111 based on the above-described fifth embodiment (FIG. 11). In addition, the guiding optical fiber 141 extends from the vicinity of the indicator lamp light source 170 to a region that goes around the front cover 130 via the end cap 113 and is sandwiched between the bumper portion 150 and the front cover 130. As described above, even when the indicator lamp light source 170 is accommodated in the metal case 111, the reflection plane 141x of the guiding optical fiber 141 can be omitted.

Eighth Embodiment

FIG. 15 is a diagram illustrating an eighth embodiment of the light projector 100. In the light projector 100 of the present embodiment, the laying position of the guiding optical fiber 141 is changed based on the above-described fifth embodiment (FIG. 11). In accordance with the present drawing, the guiding optical fiber 141 is laid from the end cap 113 toward the metal case 111 along the longitudinal direction of the light projector 100 so as to be fitted in a notched groove formed in the outer surface of the side wall of the metal case 111 rather than in a region sandwiched between the bumper portion 150 and the front cover 130. As described above, the laying position of the guiding optical fiber 141 can be arbitrarily designed within a range in which the visibility is not impaired. In the present embodiment, the end cap 113 is provided with a communication hole through which the guiding optical fiber 141 is drawn out, and a treatment for improving liquid resistance is performed between the end cap 113 and the guiding optical fiber 141 around the communication hole (see the thick line δ).

<Display Content>

FIG. 16 is a diagram illustrating a relationship between the light emission color of the indicator lamp 140 and the operation mode. As illustrated in the drawing, the indicator lamp 140 can be switched to either an operation indicator lamp mode or a work instruction lamp mode. For example, the control signal for switching the operation mode of the indicator lamp 140 may be a 2-bit (four-value) digital signal input to the input circuit 183.

First, a case where the indicator lamp 140 is set to the operation indicator lamp mode will be described. When the operation indicator lamp mode is set, the indicator lamp 140 is controlled to be turned on and off with a light emission color corresponding to the operation state of the light curtain 1.

In accordance with this drawing, for example, when the light curtain 1 is in a normal state (for example, a state in which none of the plurality of optical axes Oax1 to Oax6 is shielded), the indicator lamp 140 is turned on in green. On the other hand, when the light curtain 1 is in an abnormal state (for example, an emergency stop state in which at least one of the plurality of optical axes Oax1 to Oax6 is shielded from light), the indicator lamp 140 is lit in red. When the light curtain 1 is in the alarm notification state (for example, the NG diagnosis state by the self-diagnosis function), the indicator lamp 140 is lit in orange.

Next, a case where the indicator lamp 140 is set to the work instruction lamp mode will be described. When the work instruction lamp mode is set, the indicator lamp 140 is controlled to be turned on and off with a light emission color corresponding to the work instruction signal received by the input circuit 183.

In referring to this drawing, for example, when the work instruction signal indicates the "work permitted state", the indicator lamp 140 is lighted in green. On the other hand, when the work instruction signal indicates the "work prohibited state", the indicator lamp 140 is lit in red. When the work instruction signal indicates "alarm", the indicator lamp 140 is lit in orange.

In addition, when the light curtain 1 is used under an environment where light emission of the indicator lamp 140 is not preferable, the indicator lamp 140 can be always turned off.

<Consideration on Reduction in Light Reception Amount of Optical Axis>

As described above, the light curtain includes two components of the light projector and the light receiver, and a plurality of light projecting elements and a plurality of light receiving elements are arranged in the axial direction. When the light curtain is used, the light projector and the light receiver are disposed in parallel, and the angle is adjusted so that the light reception amount can be obtained by all the elements. The farther the distance between the light projector and the light receiver is, the more difficult it is to understand whether the orientation is correct, and the more difficult it is to see the display. Therefore, it is difficult to adjust the angle.

Light curtains may be used in harsh environments such as dirt or bumps. Therefore, in order to protect the front cover of the detection unit, there is a product provided with a bumper shape protruding from the front cover. However, it is difficult to prevent adhesion of dirt to the front cover. When adhesion of dirt accumulates and the light receiving element cannot receive light with a sufficient amount of light, the optical axis is in a light shielding state, and there is a possibility that operation of the device is stopped due to safety output from the light curtain. Therefore, maintenance for cleaning the glass surface of the front cover is required before the detection result of the optical axis is affected.

In an environment where dirt adheres, it is required to install a light curtain so as to secure a light reception amount of the optical axis with a margin against a decrease in the light reception amount of the optical axis due to dirt (=amount of light received for each optical axis serving as a determination criterion on whether the optical axis is in a light shielding state). In addition, it is also required to perform maintenance before the optical axis becomes the light shielding state by confirming a decrease in the light reception amount of the optical axis over time.

In response to the above request, there is a model capable of checking the light reception amount of the optical axis with the main body of the light curtain. For example, in an existing model, the magnitude of the light reception amount of the optical axis is expressed by the number of lighting of a plurality of light emitting diodes (LEDs) or numeral display of seven segments. However, these indications are small and difficult to see from a long distance. Therefore, it may be difficult to check the display at the time of adjusting the installation of the light curtain. In addition, even during operation of the light curtain, it is difficult to notice a decrease in the light reception amount of the optical axis unless the above-described small display is checked in consideration.

On the other hand, the light curtain 1 described in the present specification so far is provided with large indicator lamps 140 and 240 so that the operating state of the light curtain 1 can be easily visually recognized while achieving both downsizing and high visibility.

In view of the above consideration, in the following, a novel embodiment is proposed in which display linked to the light reception amount of the optical axis can be performed by the indicator lamps 140 and 240 with high visibility.

Ninth Embodiment

FIG. 17 is a diagram illustrating an arrangement example of indicator lamp light sources according to a ninth embodiment. In the present embodiment, a plurality of (two in the present drawing) substrates 190 having the same structure are cascade-connected along the longitudinal direction. With such a configuration, the light curtain 1 can be easily elongated by simply increasing the number of cascade connections of the substrates 190.

In this drawing illustrating the light projector 100, the light projecting elements 161 to 166 may be disposed at equal intervals along the longitudinal direction of the substrate 190 in a central region 190a of the substrate 190 as in FIG. 10 described above. In view of the drawing, the light projecting elements 161 to 163 are disposed on the substrate 190 on the right side of the drawing in the illustrated order from the right side to the left side of the drawing. On the other hand, on the substrate 190 on the left side in the drawing, the light projecting elements 164 to 166 are disposed in the illustrated order from the right side to the left side in the drawing. When the configuration of the light receiver 200 is understood, each of the light projecting elements 161 to 166 may be read as the light receiving elements 261 to 266.

On the other hand, the indicator lamp light sources 170 may be disposed at equal intervals along the longitudinal direction of the substrate 190 in an end region 190b of the substrate 190. In particular, the indicator lamp light source 170 can be distinguished as the indicator lamp light sources 170a, 170b, and 170c depending on a difference in each control system. In view of the drawing, the indicator lamp light sources 170a, 170b, and 170c are disposed on two substrates 190 in the illustrated order from the left side to the right side of the drawing. Although not illustrated in the drawing, the light curtain 1 includes an OSSD indicator lamp whose display mode changes according to the OSSD output, separately from the indicator lamp light source 170. Therefore, the display mode of the indicator lamp light source 170 changes so as to indicate the light receiving state of the light receiving elements 261 to 266.

As described above, the light projecting elements 161 to 163 (or 164 to 166) and the indicator lamp light sources 170a, 170b, and 170c are arranged on the common substrate 190 as one unit. In particular, the indicator lamp light sources 170a, 170b, and 170c are unitized as a set of three.

As a modification, the light projecting elements 161 to 163 (or 164 to 166) and the indicator lamp light sources 170a, 170b, and 170c may be individual units. That is, the unit in which the light projecting elements 161 to 163 (or 164 to 166) are arranged and the unit in which the indicator lamp light sources 170a, 170b, and 170c are arranged may be independent from each other.

Figure 18:
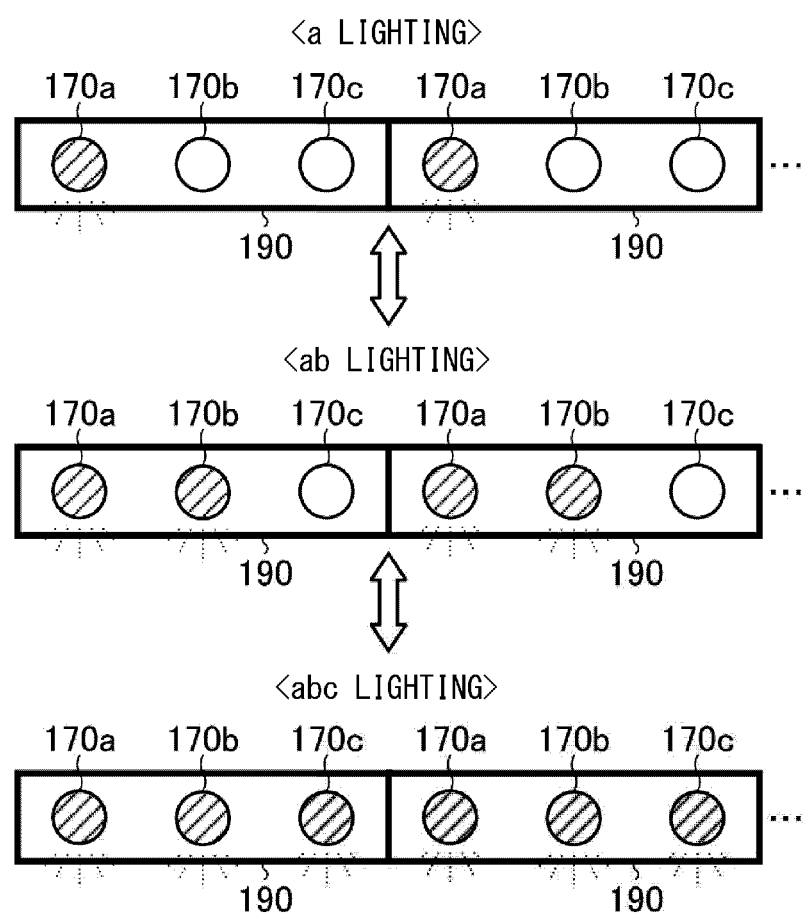
FIG. 18 is a diagram illustrating a display pattern example according to the ninth embodiment.

FIG. 18 is a diagram illustrating a display pattern example according to the ninth embodiment. In the upper part of the drawing, "a lighting state" is depicted. In this "a lighting state", the indicator lamp light source 170a is turned on, and both of the indicator lamp light sources 170b and 170c are turned off. Therefore, a display pattern in which "TURN ON ONE, TURN OFF TWO" is repeated from the left side to the right side of the paper surface is obtained.

In the middle part of the drawing, an "ab lighting state" is depicted. In this "ab lighting state", both the indicator lamp light sources 170a and 170b are turned on, and the indicator lamp light source 170*c* is turned off. Therefore, a display pattern in which "TURN ON TWO, TURN OFF ONE" is repeated from the left side to the right side of the paper surface is obtained.

In the lower part of the drawing, an "abc lighting state" is depicted. In this "abc lighting state", all of the indicator lamp light sources 170*a*, 170*b*, and 170*c* are turned on.

As described above, in the display pattern example in the present embodiment, the indicator lamp light sources 170*a*, 170*b*, and 170*c* are appropriately thinned out and turned on. Therefore, by switching the display pattern to one of the above three patterns according to the light reception amount of the optical axis, the light reception amount of the optical axis can be determined only by looking at the large indicator lamps 140 and 240. As a result, the light curtain 1 that is easily adjusted at the time of initial setting and has high maintainability is provided.

Tenth Embodiment

Figure 19:
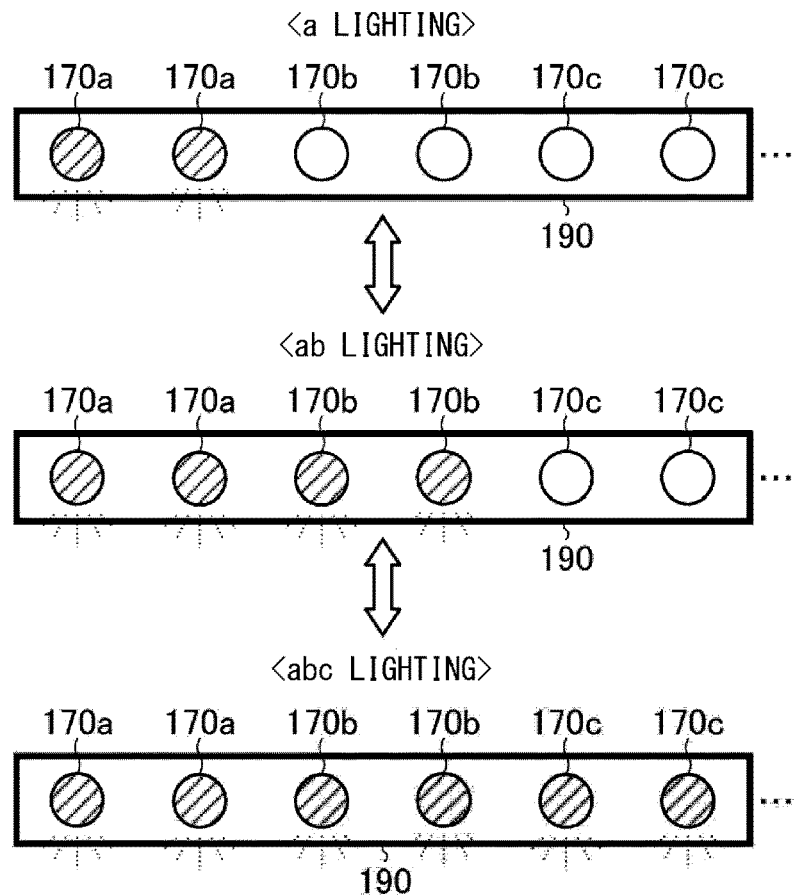
FIG. 19 is a diagram illustrating an arrangement example and a display pattern example of indicator lamp light sources in a tenth embodiment.

FIG. 19 is a diagram illustrating an arrangement example and a display pattern example of an indicator lamp light source according to a tenth embodiment. In the present embodiment, two indicator lamp light sources 170*a*, two indicator lamp light sources 170*b*, and two indicator lamp light sources 170*c* are arranged on a common substrate 190 as one unit. That is, the indicator lamp light sources 170*a*, 170*b*, and 170*c* are unitized as a set of six light sources.

In view of the drawing, the indicator lamp light sources 170*a*, 170*b*, and 170*c* are disposed two by two on the substrate 190 in the illustrated order from the left side to the right side of the drawing.

In the upper part of the drawing, "a lighting state" is depicted. In this "a lighting state", the indicator lamp light source 170*a* is turned on, and both of the indicator lamp light sources 170*b* and 170*c* are turned off. Therefore, a display pattern in which "TURN ON TWO, TURN OFF FOUR" is repeated from the left side to the right side of the paper surface is obtained.

In the middle part of the drawing, an "ab lighting state" is depicted. In this "ab lighting state", both the indicator lamp light sources 170*a* and 170*b* are turned on, and the indicator lamp light source 170*c* is turned off. Therefore, a display pattern in which "TURN ON FOUR, TURN OFF TWO" is repeated from the left side to the right side of the paper surface is obtained.

In the lower part of the drawing, an "abc lighting state" is depicted. In this "abc lighting state", all of the indicator lamp light sources 170*a*, 170*b*, and 170*c* are turned on.

In the ninth embodiment (FIG. 18) described above, the number of the indicator lamp light sources 170*a*, 170*b*, and 170*c* that are not turned on (turned off) is increased or decreased by one for each display pattern, such as 2, 1, and 0.

On the other hand, in the arrangement example of the indicator lamp light sources and the display pattern example in the present embodiment, the number of the indicator lamp light sources 170*a*, 170*b*, and 170*c* in the non-lighting state is increased or decreased by two for each display pattern, such as 4, 2, and 0. Therefore, as compared with the above-described ninth embodiment (FIG. 18), the difference in distance between light sources to be thinned out and turned on becomes large. As a result, the switching of the display pattern (and the change in the light reception amount of the optical axis) can be easily recognized through the light diffuser.

Eleventh Embodiment

Figure 20:
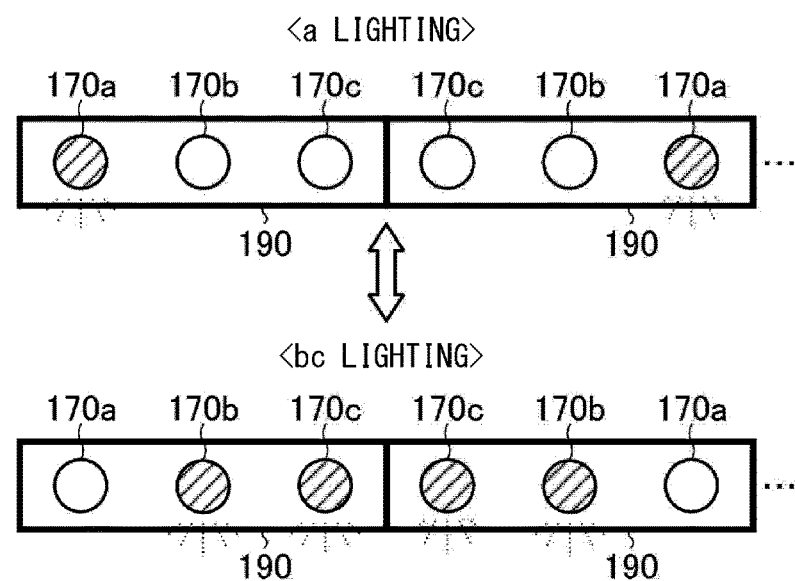
FIG. 20 is a diagram illustrating an arrangement example and a display pattern example of indicator lamp light sources in an eleventh embodiment.

FIG. 20 is a diagram illustrating an arrangement example and a display pattern example of indicator lamp light sources according to an eleventh embodiment. In the present embodiment, as in the above-described ninth embodiment (FIG. 18), the indicator lamp light sources 170*a*, 170*b*, and 170*c* are unitized as a set of three. However, the arrangement order of the indicator lamp light sources 170*a*, 170*b*, and 170*c* differs for each substrate 190.

In view of the drawing, the indicator lamp light sources 170*a*, 170*b*, and 170*c* are disposed on the substrate 190 on the left side of the drawing in the illustrated order from the left side to the right side of the drawing. On the other hand, the indicator lamp light sources 170*a*, 170*b*, and 170*c* are disposed in the illustrated order on the substrate 190 on the right side of the drawing from the right side to the left side of the drawing.

In the upper part of the drawing, "a lighting state" is depicted. In this "a lighting state", the indicator lamp light source 170*a* is turned on, and both of the indicator lamp light sources 170*b* and 170*c* are turned off. Therefore, a display pattern in which "TURN ON ONE, TURN OFF FOUR, TURN ON ONE" is repeated from the left side to the right side of the paper surface is obtained.

In the middle part of the drawing, an "ab lighting state" is depicted. In this "ab lighting state", both the indicator lamp light sources 170*a* and 170*b* are turned on, and the indicator lamp light source 170*c* is turned off. Therefore, a display pattern in which "TURN OFF ONE, TURN ON FOUR, TURN OFF ONE" is repeated from the left side to the right side of the paper surface is obtained.

As described above, in the arrangement example and the display pattern example of the indicator lamp light sources in the present embodiment, while a set of three is maintained, the number of the indicator lamp light sources 170*a*, 170*b*, and 170*c* that are turned off is increased or decreased by two for each display pattern, such as 4, 2, and 0. Therefore, as in the above-described tenth embodiment (FIG. 19), the switching of the display pattern (and the change in the light reception amount of the optical axis) can be easily recognized.

<Relationship between Light Reception Amount of Optical Axis and Display Pattern>

Figure 21:
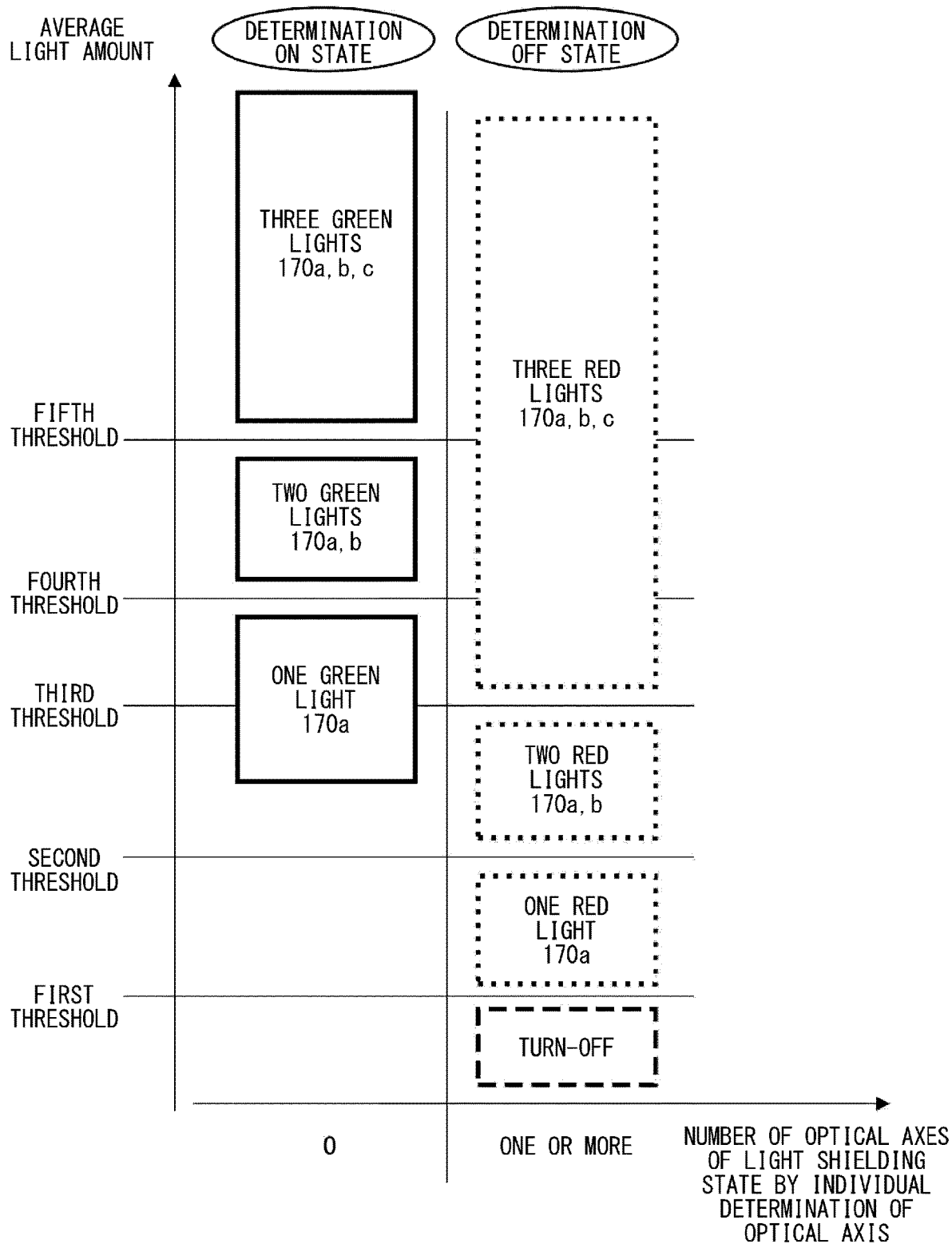
FIG. 21 is a diagram illustrating a relationship between an average light reception amount and a display pattern.

FIG. 21 is a diagram illustrating a relationship between a light reception amount of the optical axis (average light reception amount) and a display pattern. The light reception amount of the optical axis is converted by the A/D converter and compared with a threshold. The determination criterion for determining the display pattern may be an average value (=average light reception amount) of the light reception amounts on optical axes.

First, the ON state of the OSSD indicates a state in which the condition that "the light reception amounts of all the optical axes are the first threshold or more" is satisfied for the light receiving elements 261 to 266, and the OSSD output is ON. In the present embodiment, for the sake of convenience, a state in which the light receiving elements 261 to 266 satisfies the condition and the OSSD output can be turned on is set as the determination ON state, and the determination ON state is a state in which "the light reception amounts of all the optical axes are the first threshold or more". The first threshold is the same as a threshold for determining whether each individual optical axis is in the light shielding state. For this reason, the average light reception amount in this state is high to some extent, and cannot be a value low enough to be considered as "complete light shielding". That is, since the light reception amounts of all the optical axes are the first threshold or more, the average light reception amount cannot fall below the first threshold.

Therefore, the "OFF" display when the average light reception amount is less than the first threshold can be understood as a display mode in which the light receiving elements 261 to 266 exist only in a state not satisfying the condition of "the light reception amounts of all the optical axes are the first threshold or more", that is, the determination OFF state. In this drawing, a horizontal axis is introduced to clarify this. The horizontal axis indicates a result of individual light reception amount determination for each optical axis (=the number of optical axes determined to be in the light shielding state by individual determination of the optical axis). Note that the OFF state of the OSSD indicates a state in which the condition that "the light reception amounts of all the optical axes are the first threshold or more" is not satisfied for the light receiving elements 261 to 266 and the OSSD output is OFF. In the present embodiment, for convenience, a state in which "the light reception amounts of all the optical axes are the first threshold or more" is not satisfied by the light receiving elements 261 to 266, that is, a state in which "the light reception amounts of at least one or more optical axes are less than the first threshold" is defined as the determination OFF state. That is, in the determination ON state, the number of optical axes in the light shielding state is zero. On the other hand, in the determination OFF state, the number of optical axes in the light shielding state is one or more.

It should be noted that the individual light reception amount determination for each optical axis is performed only in the determination ON state (display color: green) and the determination OFF state (display color: red). Therefore, the step of determining this on the flowchart described later is the same step as the step of comparing the average light reception amount with the threshold.

In the determination ON state and the determination OFF state, the threshold serving as the determination criterion for switching the number of lighting of the indicator lamp light sources 170a, 170b, and 170c is shifted. First, the determination ON state will be described. As described above, the determination ON state is a state in which the light reception amounts of all the optical axes are equal to or larger than the first threshold. Therefore, in the determination ON state, the threshold for switching the number of lighting (the fourth threshold and the fifth threshold in this drawing) is provided in the region where the average light reception amount is relatively high.

In view of the drawing, when the average light reception amount is lower than the fourth threshold in the determination ON state, one green light is turned on (=a state in which only the indicator lamp light source 170a is turned on in green). When the average light reception amount is higher than the fourth threshold and lower than the fifth threshold, two green lights are turned on (=a state in which the indicator lamp light sources 170a and 170b are turned on in green). When the average light reception amount is higher than the fifth threshold, three (=a state in which the indicator lamp light sources 170a, 170b, and 170c are turned on in green.) lights up in green. That is, the green lighting number increases as the average light reception amount increases.

The light reception amount of each optical axis decreases as the distance between the light projector 100 and the light receiver 200 increases. Although the light projector 100 and the light receiver 200 are provided in parallel and can normally receive light without contamination, it is also conceivable that the light reception amount decreases only due to an increase in the distance between the light projector 100 and the light receiver 200.

If the number of lighting of the indicator lamp light sources 170a, 170b, and 170c is reduced in such a situation, information regarding installation and maintenance cannot be correctly transmitted. Therefore, it is desirable to set the threshold so as to widen the region where the number of lighting of the indicator lamp light sources 170a, 170b, and 170c is 3. In view of the drawing, in the determination ON state, the fifth threshold for switching the number of lighting of the indicator lamp light sources 170a, 170b, and 170c to be turned on between three and two is set to be relatively low.

Next, the determination OFF state will be described. The switching control of the display pattern in the determination OFF state is useful when the light projector 100 and the light receiver 200 are installed. For example, a case will be considered in which the installation positions of the light projectors 100 and 200 are adjusted starting from the turn-off state in which the number of times of turning on is 0. In this case, in order to grasp the directionality of the adjustment (=whether it is close to the correct installation position), it is desirable that the display pattern is switched even if the average light reception amount slightly increases or decreases.

For this reason, in the determination OFF state, the threshold (in the drawing, a first threshold, a second threshold, and a third threshold are illustrated) for switching the number of lighting is provided in the region where the average light reception amount is relatively low. For example, the relationship between the respective thresholds may be first threshold <second threshold <third threshold <fourth threshold <fifth threshold as illustrated in FIG. 5. In the embodiment illustrated in the drawing, the first threshold, the second threshold, and the third threshold do not affect the switching of the number of lighting in the ON state.

In referring to this drawing, when the average light reception amount is lower than a first threshold in the determination OFF state, the state becomes the turn-off state (=State in which the indicator lamp light sources 170a, 170b, and 170c are turned off) as described above. When the average light reception amount is higher than the first threshold and lower than the second threshold, one red light is turned on (=a state in which only the indicator lamp light source 170a is turned on in red). When the average light reception amount is higher than the second threshold and lower than the third threshold, two red lights are turned on (=a state in which the indicator lamp light sources 170a and 170b are turned on in red). When the average light reception amount is higher than the third threshold, three red lights are turned on (=a state in which the indicator lamp light sources 170a, 170b, and 170c are turned on in red). That is, the number of red lights increases as the average light reception amount increases.

As described above, in the determination ON state and the determination OFF state, the purpose of switching the display pattern is different according to the light reception amount of the optical axis. Specifically, it is assumed that the display pattern switching in the green lighting in the determination ON state is useful for grasping dirt adhesion (necessity of maintenance) after the start of operation of the light curtain 1. On the other hand, it is assumed that the display pattern switching in the red lighting in the determination OFF state is useful for optical axis adjustment when the light curtain 1 is installed. Therefore, in order to individually set optimal thresholds for the determination ON state and the determination OFF state, it is desirable to shift the thresholds between the determination ON state and the determination OFF state.

However, contrary to the above, it is also advantageous to match the threshold between the determination ON state and the determination OFF state. For example, in this drawing, when only the average light reception amount is viewed, "one green light" in the determination ON state and "three red lights (or two red lights)" in the determination OFF state are adjacent to each other. Therefore, when the optical axis is shielded from light and the determination ON state is switched to the determination OFF state while the average light reception amount is maintained, the display pattern is switched from "one green light" to "three red lights (or two red lights)".

That is, focusing only on the number of times of lighting, there is a possibility that the display pattern is switched with a sense of discomfort that the number of times of lighting increases even though the optical axis is shielded from light. Therefore, if priority is given to the purpose of transmitting the light reception amount of the optical axis in an easily understandable manner, it can be said that it is desirable to align the threshold between the determination ON state and the determination OFF state so that the reverse rotation phenomenon of the number of lightings does not occur.

Figure 22:
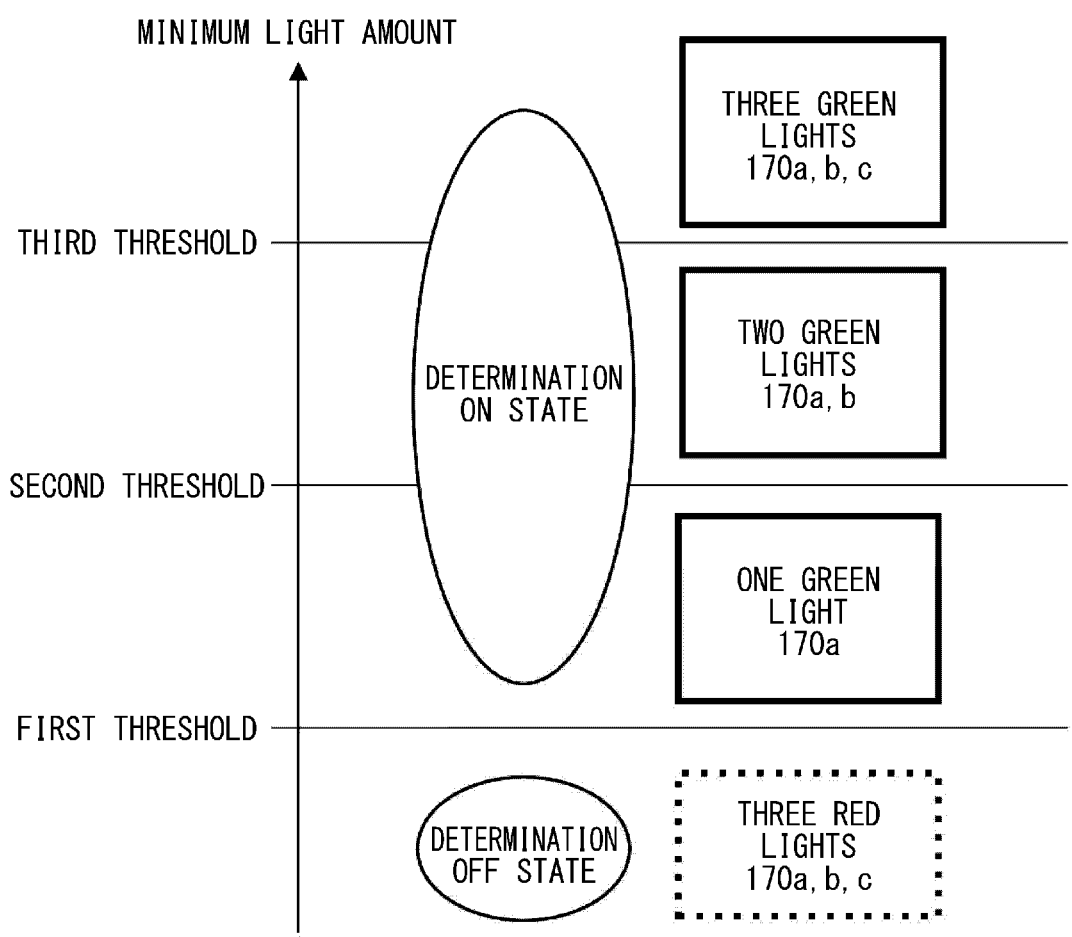
FIG. 22 is a diagram illustrating a relationship between a minimum light reception amount and a display pattern.

FIG. 22 is a diagram illustrating a relationship between a light reception amount of the optical axis (minimum light amount) and a display pattern. As illustrated in the drawing, the determination criterion for determining the display pattern may be the minimum value (=minimum light amount) of the light reception amount on each optical axis.

In this case, for example, a first threshold, a second threshold, and a third threshold are set as the threshold setting. The relationship between the thresholds may be first threshold <second threshold <third threshold.

In view of the drawing, when the minimum light amount is lower than the first threshold, three red lights are turned on (=a state in which the indicator lamp light sources 170a, 170b, and 170c are turned on in red). This state corresponds to the determination OFF state. In this manner, in the determination OFF state, the number of red lights is fixed to three. When the minimum light amount is higher than the first threshold and lower than the second threshold, one green light is turned on (=a state in which only the indicator lamp light source 170a is turned on in green). When the minimum light amount is higher than the second threshold and lower than the third threshold, two green lights are turned on (=a state in which the indicator lamp light sources 170a and 170b are turned on in green). When the minimum light amount is higher than the third threshold, three green lights are turned on (=a state in which the indicator lamp light sources 170a, 170b, and 170c are turned on in green.). That is, the number of green lights increases as the minimum light amount increases.

As described above, as the determination criterion for determining the display pattern, the average value (=average light reception amount) of the light reception amounts in the optical axes may be adopted, or the minimum value (=minimum light amount) may be adopted.

<Lighting Image>

Figure 23:
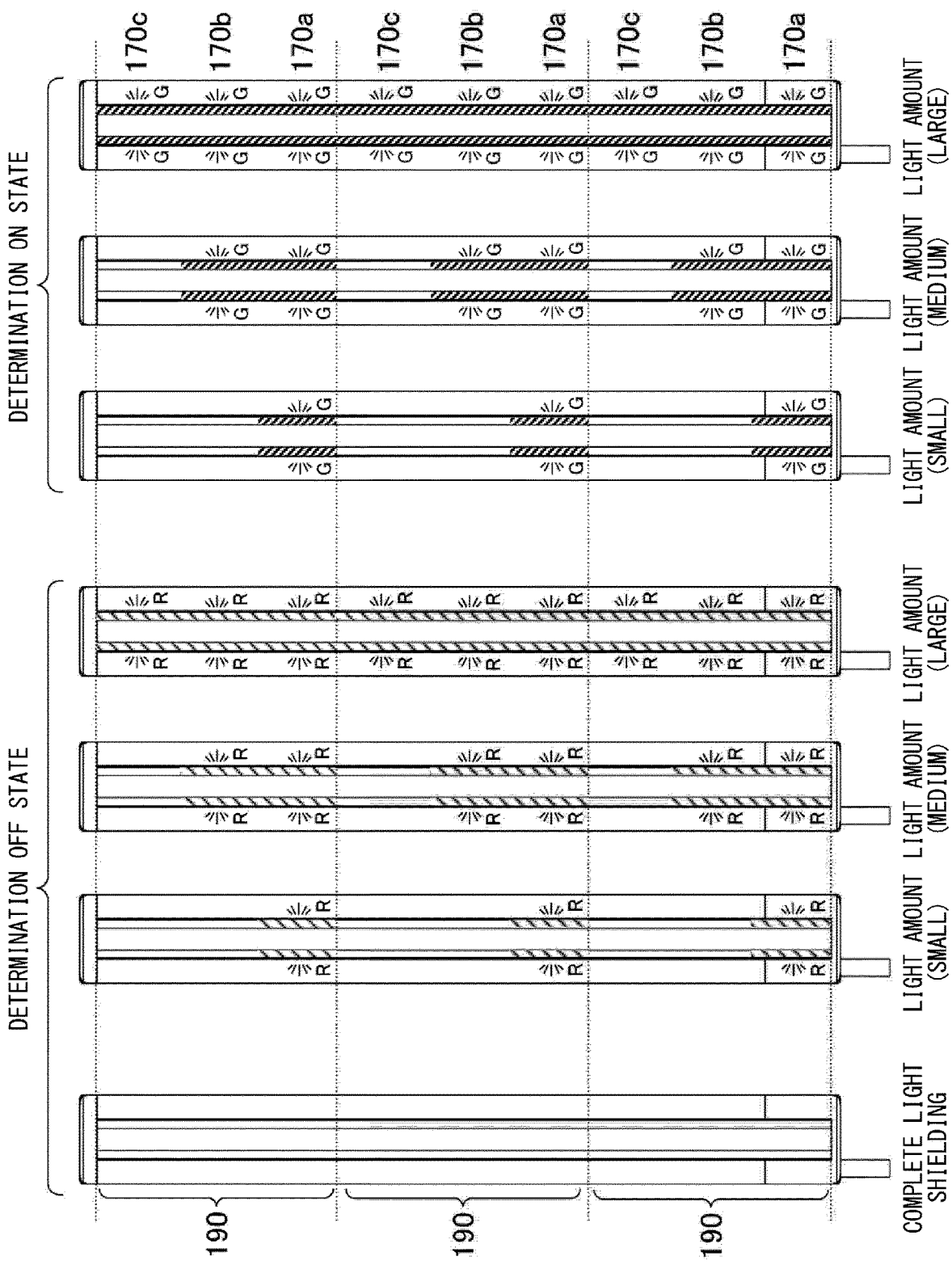
FIG. 23 is a diagram illustrating a lighting image (first example) of a light curtain.

FIG. 23 is a diagram illustrating a lighting image (first example) of the light curtain 1. In this drawing, the above-described ninth embodiment (FIGS. 17 and 18) is adopted as an arrangement example and a display pattern of the indicator lamp light sources 170a, 170b, and 170c. For the relationship between the light reception amount of the optical axis and the display pattern, the switching control of the display pattern described above with reference to FIG. 21 is adopted.

First, the determination OFF state (four states on the left side of the drawing) will be described. In the complete light shielding state, the light curtain 1 is turned off (=State in which the indicator lamp light sources 170a, 170b, and 170c are turned off). In the light amount (small), one red light is turned on (=a state in which only the indicator lamp light source 170a is turned on in red). In the light amount (middle), two red lights are turned on (=a state in which the indicator lamp light sources 170a and 170b are turned on in red). In the light amount (large), three red lights are turned on (=a state in which the indicator lamp light sources 170a, 170b, and 170c are turned on in red).

Next, the determination ON state (three states on the right side of the drawing) will be described. At the light amount (small), one green light is turned on (=a state in which only the indicator lamp light source 170a is turned on in green). In the light amount (middle), two green lights are turned on (=a state in which the indicator lamp light sources 170a and 170b are turned on in green). In the light amount (large), three green lights are turned on (=a state in which the indicator lamp light sources 170a, 170b, and 170c are turned on in green).

A diffuser is disposed above each of the indicator lamp light sources 170a, 170b, and 170c. Therefore, it is desirable to appropriately set the arrangement of the indicator lamp light sources 170a, 170b, and 170c and the display pattern so that switching of the display pattern can be recognized also through the diffuser. This point is also as described above.

Figure 24:
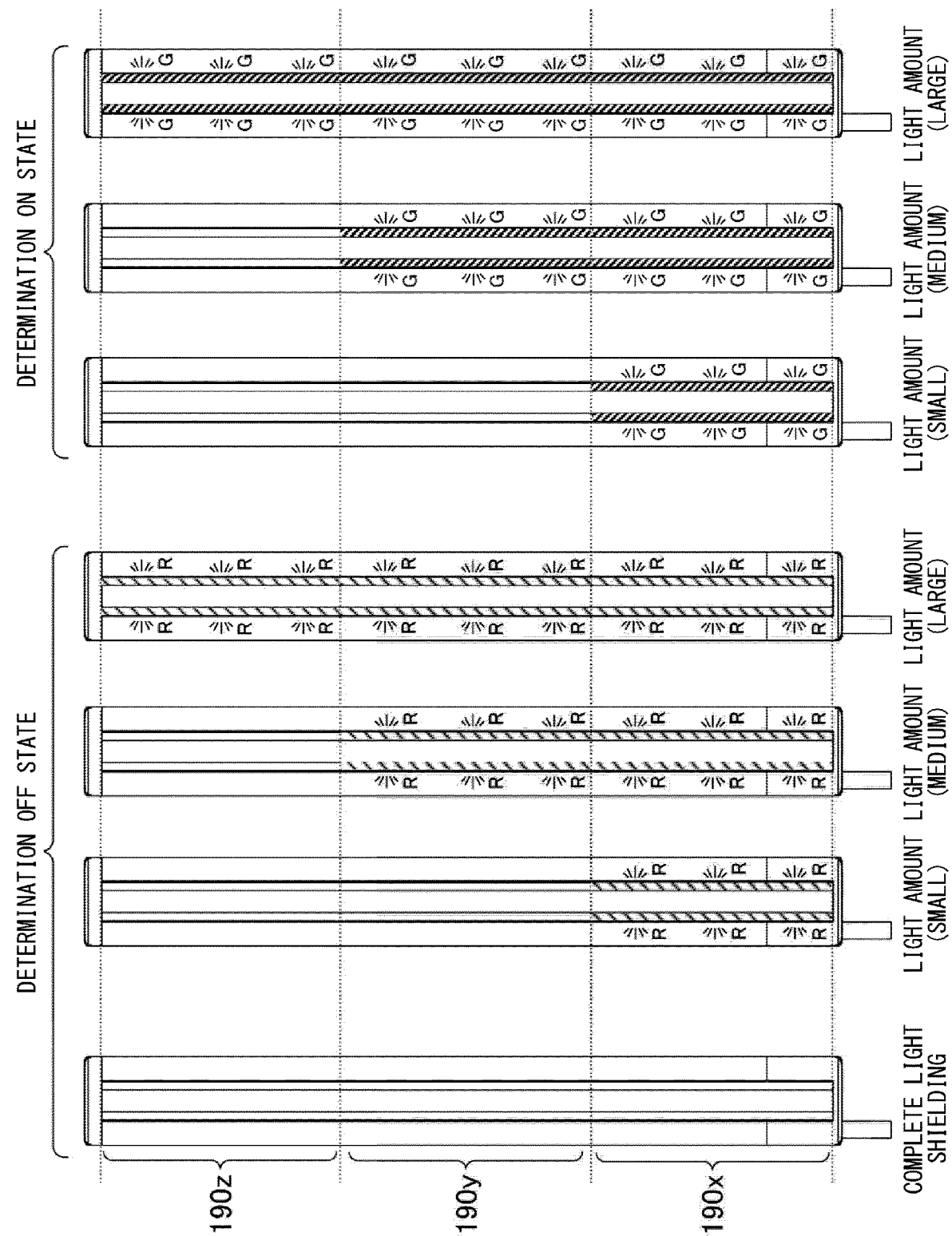
FIG. 24 is a diagram illustrating a lighting image (second example) of the light curtain.

FIG. 24 is a diagram illustrating a lighting image (second example) of the light curtain 1. In this drawing, bar display of the light curtain 1 according to the light reception amount of the optical axis is performed. Specifically, each of three substrates 190x, 190y, and 190z cascade-connected in the longitudinal direction of the light curtain 1 (more precisely, a group of indicator lamp light sources 170 incorporated therein) is turned on and off as an individual unit.

First, the determination OFF state (four states on the left side of the drawing) will be described. In the complete light shielding state, the light curtain 1 is turned off (=a state in which the substrates 190x, 190y, and 190z are turned off). In the light amount (small), ⅓ of the light curtain 1 is turned on with a bar in red (=only the substrate 190x is turned on in red). In the light amount (medium), ⅔ of the light curtain 1 is in a state in which the bar is turned on in red (=a state in which the substrates 190x and 190y are turned on in red). In the light amount (large), the entire light curtain 1 (3/3) is turned on with a bar in red (=a state in which the substrates 190x, 190y, and 190z are turned on in red).

Next, the determination ON state (three states on the right side of the drawing) will be described. In the light amount (small), ⅓ of the light curtain 1 is turned on with a bar in green (=only the substrate 190x is turned on in green). In the light amount (medium), ⅔ of the light curtain 1 is turned on with a bar in green (=the substrates 190x and 190y are turned on in green). In the light amount (large), the entire light curtain 1 (3/3) is turned on with a bar in green (=a state in which the substrates 190x, 190y, and 190z are turned on in green).

As described above, in the lighting image of the second example (FIG. 24), the switching of the display pattern according to the light reception amount of the optical axis is more easily grasped as compared with the above-described first example (FIG. 23). Note that, in a case where the above-described lighting image is realized on the basis of the configuration in which the plurality of substrates 190*x*, 190*y*, and 190*z* are cascade-connected, the design difficulty level and the cost may increase.

<Modification of Display Pattern according to Light Reception Amount of Optical Axis>

In the above description, the configuration has been exemplified in which the number of times of lighting (in particular, a thinning interval) of the indicator lamp light source 170 is switched according to the light reception amount of the optical axis. However, other various modifications are conceivable.

For example, the temporal change (for example, whether to constantly turn on the indicator lamp 140, blink at intervals of 1 second, or blink at intervals of 2 seconds) of the indicator lamp 140 may be switched according to the light reception amount of the optical axis. Further, for example, the light emission amount or the light emission color of the indicator lamp 140 may be switched according to the light reception amount of the optical axis. When these aspects are adopted, it is not necessary to individually control the plurality of indicator lamp light sources 170 at the time of switching the display pattern. Therefore, the guiding optical fibers 141 (see FIGS. 11 to 15) can be used as the indicator lamp 140.

<Functional Blocks (with Display Pattern Control Function)>

Figure 25:
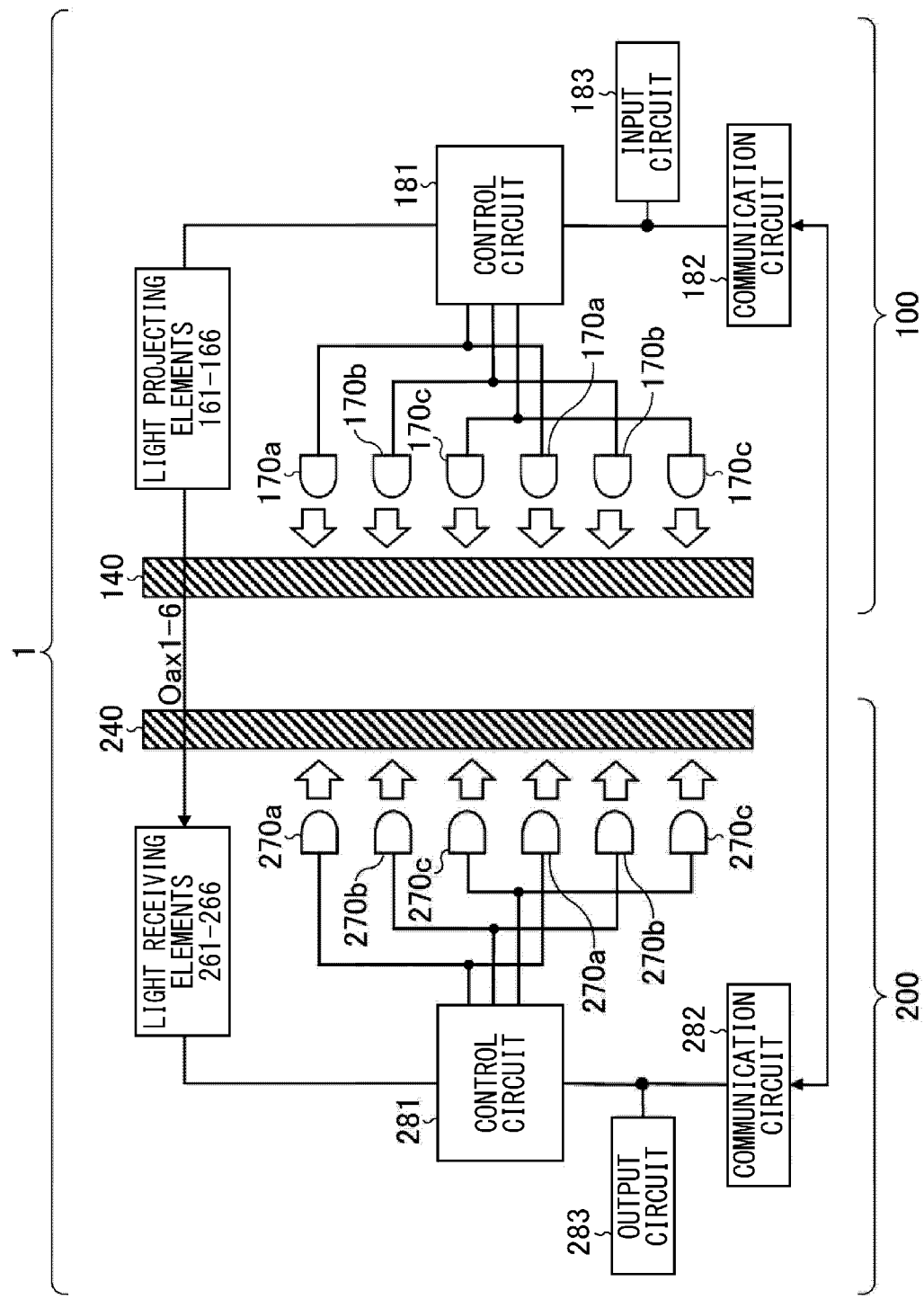
FIG. 25 is a functional block diagram of a light curtain having a display pattern control function.

FIG. 25 is a functional block diagram of the light curtain 1 having a display pattern control function. In the drawing, based on FIG. 5 described above, the control systems of the indicator lamp light sources 170*a*, 170*b*, and 170*c* and indicator lamp light sources 270*a*, 270*b*, and 270*c* are focused instead of the light emitting/light receiving systems of the optical axes Oax1 to Oax6.

In the drawing, according to the ninth embodiment (FIGS. 17 and 18) described above, the indicator lamp light sources 170*a*, 170*b*, and 170*c*, and the indicator lamp light sources 270*a*, 270*b*, and 270*c* are arranged as a set of three in the illustrated order (in the order of a, b, c, a, b, and c from the upper side of the page).

The control circuit 181 controls the two indicator lamp light sources 170*a* with a common control signal. The same applies to the indicator lamp light sources 170*b* and 170*c*. In addition, the control circuit 281 controls the two indicator lamp light sources 270*a* using a common control signal. The same applies to the indicator lamp light sources 270*b* and 270*c*.

The light reception amount of each of the optical axes Oax1 to Oax6 is compared with a threshold in the control circuit 281. In this case, the control circuit 281 may include an analog/digital conversion circuit that converts an analog signal output from each of the light receiving elements 261 to 266 into a digital signal. In addition, the control circuit 281 may include an arithmetic circuit that calculates an average value (=average light reception amount) or a minimum value (=minimum light reception amount) from the light reception amount of each of the optical axes Oax1 to Oax6.

The control circuit 281 performs on/off control of each of the indicator lamp light sources 270*a*, 270*b*, and 270*c* on the basis of a comparison result between the average light reception amount (or the minimum light reception amount) and the threshold. In addition, the control circuit 281 transmits the above-described comparison result to the control circuit 181 via the communication circuits 282 and 182. The control circuit 181 performs on/off control of each of the indicator lamp light sources 170*a*, 170*b*, and 170*c* on the basis of the comparison result transmitted from the control circuit 281.

<Processing Flow>

Figure 26:
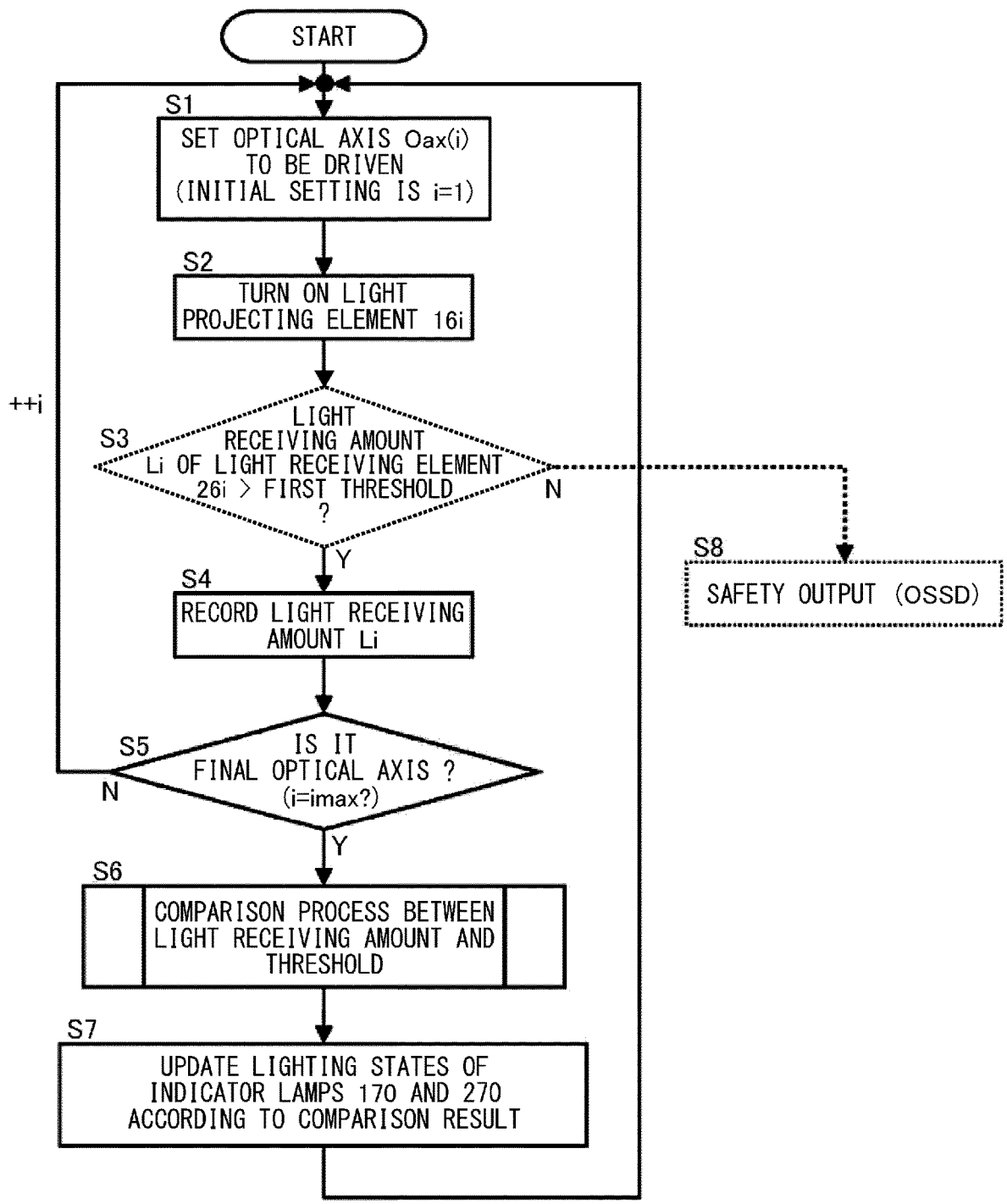
FIG. 26 is a diagram illustrating a processing flow of display pattern control.

FIG. 26 is a diagram illustrating a processing flow of display pattern control based on an average light reception amount. When the processing flow of the drawing is started, in step S1, the optical axis Oax(i) (where i=1, 2, . . . imax(6) and the initial setting value is i=1) to be driven is set.

In the subsequent step S2, a light projecting element 16*i* is turned on. That is, first, the light projecting element 161 for forming the optical axis Oax1 is turned on.

In step S3, it is determined whether a light reception amount Li in a light receiving element 26*i* is larger than the first threshold. As described above, the first threshold corresponds to the threshold for determining whether each of the optical axes Oax1 to Oax6 is in the light shielding state. Here, if the determination is YES, the flow proceeds to step S4. On the other hand, when the determination is NO, the flow proceeds to step S8. In step S8, the safety output (OSSD) is switched to the OFF state without waiting for completion of the display pattern control. Therefore, it is possible to promptly stop a dangerous source such as a press machine. In step S8, in addition to the safety output (OSSD) being switched to the OFF state, the display mode of the OSSD indicator lamp may be changed according to the safety output (OSSD) being switched to the OFF state. Steps S3 and S8 are not directly related to the display pattern control. Therefore, steps S3 and S8 are depicted by broken lines in the drawing.

When YES is determined in step S3, the light reception amount Li is recorded in a register or the like in step S4.

In the subsequent step S5, it is determined whether the optical axis is the final optical axis (that is, i=imax(6)). Here, if the determination is YES, the flow proceeds to step S6. On the other hand, when the determination is NO, the flow returns to step S1 after the variable i is incremented by one (++i). Thereafter, steps S1 to S5 are repeated until YES is determined in step S5.

When YES is determined in step S5, in step S6, comparison processing is performed between the average value (=average light reception amount) or the minimum value (=minimum light reception amount) of the light reception amounts and a plurality of thresholds. The comparison processing in this step has been described above with reference to FIGS. 21 and 22. Therefore, redundant description is omitted.

In the subsequent step S7, the lighting state (display pattern) of each of the indicator lamps 140 and 240 is updated according to the comparison result obtained in step S6. Thereafter, the flow returns to step S1, and the series of processing is repeated.

Note that this drawing is drawn with the fact that in step S6, comparison processing between an average value of light reception amounts (=average light reception amount) and a plurality of thresholds can be performed in mind. That is, the comparison processing in step S6 is not performed for each optical axis, but is performed after the light reception amounts of all the optical axes are recorded.

However, in a case where the comparison processing between the minimum value (=the minimum light reception amount) of the light reception amount and the plurality of thresholds is performed, step S5 may be omitted. That is, the comparison processing in step S6 may be sequentially performed one optical axis at a time without waiting for the light reception amounts of all the optical axes to be recorded.

For example, when the light reception amount obtained by the first light receiving element 261 is equal to or less than the second threshold, it is sufficient to switch to one green light (=a state in which only the indicator lamp light source 170a is turned on in green) without comparing the light reception amount of each of the other light receiving elements 262 to 266 with the threshold (see FIG. 22). Therefore, the subsequent comparison processing can be omitted.

SUMMARY

In FIGS. 17 to 26 described above, the light curtain 1 having a function of switching a display pattern according to the light reception amount of the optical axis has been proposed. Briefly describing this configuration, it can be expressed as "A light curtain including: a housing in which one element of a pair of a light projecting element and a light receiving element forming a plurality of optical axes is disposed inside along a longitudinal direction in order to form the plurality of optical axes at intervals, the housing including a metal case extending in the longitudinal direction and end members connected to both ends of the metal case; a cover that transmits light from the light projecting element and is attached to the housing so as to cross the plurality of optical axes; an indicator lamp that is a light diffusing member disposed outside an outer surface of at least one of the cover and the housing along the longitudinal direction or formed in series with the cover; and an indicator lamp light source that is accommodated in the housing and supplies light for displaying toward the indicator lamp, in which when an operation indicator lamp mode is set, the indicator lamp light source is controlled to be turned on and off with a light emission color corresponding to an operation state of the light curtain and with a display pattern corresponding to a light reception amount of the light receiving element."

<Other Modifications>

Note that, in addition to the above-described embodiments, various modifications can be made to various technical features disclosed in the present specification without departing from the spirit of the technical creation. That is, it is to be understood that the above embodiments are illustrative in all respects and not restrictive, and the technical scope of the invention is defined by the claims, and includes all modifications falling within the meaning and scope equivalent to the claims.

What is claimed is:

1. A light curtain comprising:
   a housing in which one element of a pair of a light projecting element and a light receiving element forming a plurality of optical axes is disposed inside along a longitudinal direction in order to form the plurality of optical axes at intervals, the housing including a metal case extending in the longitudinal direction and end members connected to both ends of the metal case;
   a cover that transmits light from the light projecting element and is attached to the housing so as to cross the plurality of optical axes;
   an indicator lamp that is a light diffusing member disposed outside an outer surface of at least one of the cover and the housing along the longitudinal direction or formed in series with the cover; and
   an indicator lamp light source that is accommodated in the housing and supplies light for displaying toward the indicator lamp.

2. The light curtain according to claim 1, further comprising a bumper portion that protrudes outward from a region of an outer surface of the cover intersecting the plurality of optical axes and disposed along the longitudinal direction.

3. The light curtain according to claim 2, wherein the bumper portion is formed of the metal case, and the indicator lamp is disposed adjacent to the bumper portion.

4. The light curtain according to claim 3, wherein the indicator lamp is disposed between the bumper portion and the cover.

5. The light curtain according to claim 2, wherein the bumper portion is formed by the indicator lamp.

6. The light curtain according to claim 5, wherein the bumper portion is attached to the metal case, and the cover is supported by the bumper portion.

7. The light curtain according to claim 1, wherein the indicator lamp light source supplies light for displaying toward the indicator lamp through the cover.

8. The light curtain according to claim 1, wherein the metal case includes a pair of protruding stripes disposed across the plurality of optical axes, and the indicator lamp diffuses light from the indicator lamp light source passing between the pair of protruding stripes.

9. The light curtain according to claim 8, wherein the cover is supported by the pair of protruding stripes.

10. The light curtain according to claim 1, wherein the indicator lamp contains a light diffuser.

11. The light curtain according to claim 1, wherein the indicator lamp has a surface machined to diffuse light from the indicator lamp light source.

12. The light curtain according to claim 1, wherein the indicator lamp is formed in a region that forms a part of the cover and does not interfere with the plurality of optical axes.

13. The light curtain according to claim 12, wherein in the cover, a region not interfering with the plurality of optical axes and a region intersecting the plurality of optical axes are molded with different materials.

14. The light curtain according to claim 10, wherein the cover is machined differently between a surface of a region that does not interfere with the plurality of optical axes and a surface of a region that intersects the plurality of optical axes.

15. The light curtain according to claim 1, wherein
   the indicator lamp includes a side emission type guiding optical fiber, and
   the indicator lamp light source supplies light for displaying toward the indicator lamp to the guiding optical fiber including a reflection plane for receiving light for displaying toward the indicator lamp through the cover, or supplies the light for displaying toward the indicator lamp to the guiding optical fiber through the end member.

16. The light curtain according to claim 1, wherein the one element corresponding to at least one optical axis of the plurality of optical axes is disposed on the end member.

17. The light curtain according to claim 1, wherein when an operation indicator lamp mode is set, the indicator lamp light source is controlled to be turned on and off with a light emission color corresponding to an operation state of the light curtain.

18. The light curtain according to claim 1, further comprising an input circuit that receives an input of an work instruction signal, wherein the indicator lamp light source is controlled to be turned on and off with a light emission color corresponding to the work instruction signal when a work instruction lamp mode is set.

\* \* \* \* \*